US012282375B2

(12) United States Patent
Rintamaeki et al.

(10) Patent No.: US 12,282,375 B2
(45) Date of Patent: Apr. 22, 2025

(54) SYSTEMS AND METHODS FOR THERMAL SYSTEM MANAGEMENT

(71) Applicant: Microsoft Technology Licensing, LLC, Redmond, WA (US)

(72) Inventors: Mika Juhani Rintamaeki, Redmond, WA (US); Gregory Allen Nielsen, Kirkland, WA (US); Rajagopal K. Venkatachalam, Sammamish, WA (US); Ajit Justin, Sammamish, WA (US); Francisco Cantu De La Garza, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/529,591

(22) Filed: Dec. 5, 2023

(65) Prior Publication Data

US 2024/0103598 A1 Mar. 28, 2024

Related U.S. Application Data

(62) Division of application No. 16/855,875, filed on Apr. 22, 2020, now Pat. No. 11,892,893.

(Continued)

(51) Int. Cl.

*G06F 1/32* (2019.01)
*G05B 17/02* (2006.01)

(Continued)

(52) U.S. Cl.

CPC ........... *G06F 1/3234* (2013.01); *G05B 17/02* (2013.01); *G06F 1/206* (2013.01); *G06F 1/3212* (2013.01)

(58) Field of Classification Search

CPC .................................... G06F 1/20; G06F 1/32
See application file for complete search history.

(56) References Cited

U.S. PATENT DOCUMENTS 6,651,178 B1 11/2003 Voegeli
2019/0187766 A1 * 6/2019 Hirosawa ................. G06F 1/28

(Continued)

OTHER PUBLICATIONS

Non-Final Office Action mailed on Jul. 18, 2024, in U.S. Appl. No. 18/529,563, 11 pages.

(Continued)

*Primary Examiner* — Paul B Yanchus, III
(74) *Attorney, Agent, or Firm* — RAY QUINNEY & NEBEKER P.C.; Paul N. Taylor

(57) ABSTRACT

A method of thermal and power control in a computing device includes, at the computing device, initializing a thermal module of the computing device, receiving data at the thermal module from a first component assigned to an interface of the thermal module, and sending an output to a second component from the thermal module based on the data. Initializing the thermal module includes detecting a presence of a plurality of potential components of the computing device; querying each of the plurality of potential components to determine capabilities of each component; in response to the querying, for each of at least a subset of the plurality of potential components receiving identification information for the component and, based on the received identification information, configuring one or more interfaces of the plurality of predefined interfaces of the thermal module to establish communication with the sub set of components.

20 Claims, 24 Drawing Sheets

Related U.S. Application Data

(60) Provisional application No. 62/908,956, filed on Oct. 1, 2019, provisional application No. 62/908,938, filed on Oct. 1, 2019.

(51) Int. Cl.

| | |
|---|---|
| ***G06F 1/20*** | (2006.01) |
| ***G06F 1/3212*** | (2019.01) |
| ***G06F 1/3234*** | (2019.01) |

(56) References Cited

U.S. PATENT DOCUMENTS

| | | | | |
|---|---|---|---|---|
| 2020/0264692 | A1* | 8/2020 | Gorbatov | G06F 1/3296 |
| 2021/0026433 | A1* | 1/2021 | Wood | G06F 1/3246 |
| 2024/0103597 | A1 | 3/2024 | Rintamaeki | |

OTHER PUBLICATIONS

Notice of Allowance mailed on Nov. 20, 2024, in U.S. Appl. No. 18/529,563, 5 pages.
U.S. Appl. No. 16/855,875, filed Apr. 22, 2020.

* cited by examiner

Table 10.1

| Input | | Output | |
|---|---|---|---|
| Low | High | - | |
| 0 | 0 | 0 | No PSU |
| 1 | 150000 | 1 | PSU detected up to 150W |
| Default if Lower than 0 | | 0 | Keep safe and assume no PSU |
| Default if Higher than 150000 | | 0 | Keep safe and assume no PSU |

| P0 | P1 | P2 | P3 | P4 | P5 |
|---|---|---|---|---|---|
| 117007 | 15008 | 1.6 | -11 | 117006 | 0 |

Table 10.2

Linear Math Parameter Notes

P0 Max
P1 Min
P2 Coefficient
P3 Offset
P4 Default
P5 Invert Input (0=no)

Output = I_BATT1_RSOC x Coefficient + Offset

FIG. 10-2

| Input1 Source | Input 1 Reading | Input2 Source | Input 2 Reading | Output Node | Node Value |
|---|---|---|---|---|---|
| I_PSU_SIZE | 60W | I_BATT1_RSOC | 92% | VN30 | 117W |

| No PSU Inputs | Value |
|---|---|
| Slope | 1.6 |
| Intercept | -11 |

| With PSU Inputs | Value |
|---|---|
| Slope | 1.2 |
| Intercept | -5 |

| Control Limit Config | Value |
|---|---|
| Min Output Limit | 15W |
| Max Output Limit | 117W |

FIG. 10-3

Table 8.1

| Input | | Output | |
|---|---|---|---|
| Low | High | - | |
| 10 | 100 | 1 | Assume healthy RSOC |
| Default if Lower than 10 | | 2 | Assume low RSOC |
| Default if Higher than 100 | | 1 | Abnormal event, assume healthy RSOC |

Table 8.2

P0 PID Error Buffer Length
P1 Number of PIDs
P2 Hysteresis
P3 Deadband
P4 Default PID Index

| P0 | P1 | P2 | P3 | P4 | P5 | P6 | P7 | P8 | P9 | P10 | P11 | P12 |
|---|---|---|---|---|---|---|---|---|---|---|---|---|
| 20 | 2 | 10 | 5 | 1 | end | | | | | | | |
| 2 | 1 | 1 | 25011 | 25012 | 5013 | 25000 | 45000 | 0 | 10 | 0 | 0.1 | end |
| 2 | 2 | 2 | 25011 | 25012 | 5013 | 25000 | 31500 | 0 | 10 | 0 | 0.1 | end |

PID State Definitions

1 = Healthy RSOC
2 = Low RSOC

FIG. 13-3

| Input1 Source | Input 1 Reading | Input2 Source | Input 2 Reading | Output Node | Node Value |
|---|---|---|---|---|---|
| I_BATT1_RSOC | 67% | I_BCDR1 | 0W | VN17 | 100% |

| Battery Relative State of Charge (RSOC) | Initial Output | PID Limit | Dead-Band | Polling Rate | PID kP | PID kI | PID kD | PID Min | PID Max | Output Default |
|---|---|---|---|---|---|---|---|---|---|---|
| Normal Charge Levels (>10%) | 100% | 45W | 0W | 20sec | 300 | 0.5 | 0 | 25% | 100% | 100% |
| Low Charge Levels (0~10%) | 100% | 31.5W | 0W | 20sec | 300 | 0.5 | 0 | 25% | 100% | 100% |

FIG. 13-4

Thermal Management Operation

Note: OS slider position has impact to these values

- Touch Temperature: 44.7C
- Battery Temperature: 37.1C
- Touch Temperature Limit: 45C Limited
- Fan RPM: 5000 RPM
- OS Slider Position: Recommended
- Device Posture: Laptop
- Processor Power Consumption: 12.8W ~ 12.9W Avg / 25W Max Limit
- Backlight Power Consumption: 3.9W ~ 100% Limited
- System Power Consumption: 19.7W ~ 48W Average Limit

Power Management Operation

- System Battery Level: 100%
- PSU Status: Disconnected – 0W
- Backlight Level: 30%
- System Brown-out Protection: Active – 81% Processor Peak Limited
- Battery Discharge Rate Protection: Inactive – 25W Processor Avg Limit
- Underpowered PSU Protection: Inactive – 25W Processor Avg Limit

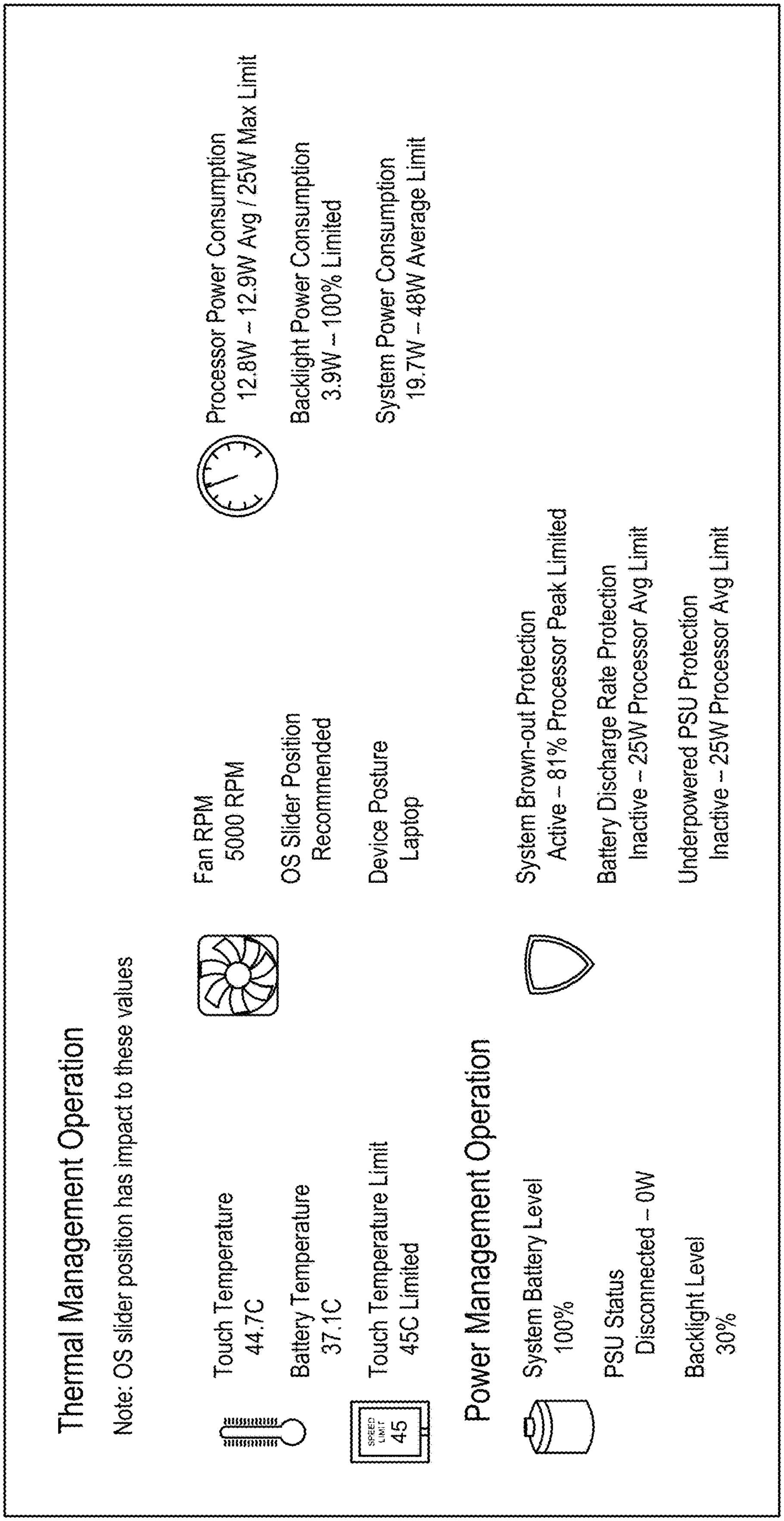

FIG. 16

SYSTEMS AND METHODS FOR THERMAL SYSTEM MANAGEMENT

CROSS-REFERENCE TO RELATED APPLICATIONS

This application is a continuation of U.S. patent application Ser. No. 16/855,875, filed Apr. 22, 2020, which claims priority to and the benefit of U.S. Provisional Patent Application No. 62/908,938, filed Oct. 1, 2019 and U.S. Provisional Patent Application No. 62/908,956, filed Oct. 1, 2019, which are hereby incorporated by reference in their entireties.

BACKGROUND

Background and Relevant Art

Computing devices utilize a variety of electronic components to provide flexibility in performance. The electronic components can generate thermal energy that must be managed for the safe operation of the computing device. Typically, increasing the performance of the electronic components, such as a central processing unit (CPU), a graphical processing unit (GPU), system memory, power supply, displays, communication devices, or other electronic components increases the amount of thermal energy generated.

BRIEF SUMMARY

In some embodiments, a computing device has a variety of electronic components that generate thermal energy. Increasing the performance (e.g., increasing clock speed, voltage, current) of the electronic components generates more thermal energy. Elevated temperatures can damage the electronic components. In some embodiments, a computing device includes a thermal module that is in data communication with a plurality of the electronic components. In some embodiments, the thermal module accesses or read a system configuration file, a registry, or a unified extensible firmware interface (UEFI) to generate a list of potential components with which the thermal module can communicate. After querying the potential components, the thermal module assigns those components that provide a response to interfaces of the thermal module to establish communication with the components. In some embodiments, the thermal module receives inputs from one or more of the components, evaluates the inputs to decide whether any component performances or thermal properties should be changed, and sends an output to the appropriate components.

In some embodiments, a method of thermal and power control in a computing device includes, at the computing device, initializing a thermal module of the computing device, receiving data at the thermal module from a first component assigned to an interface of the thermal module, and sending an output to a second component from the thermal module based on the data. Initializing the thermal module includes detecting a presence of a plurality of potential components of the computing device; querying each of the plurality of potential components to determine capabilities of each component; in response to the querying, for each of at least a subset of the plurality of potential components receiving identification information for the component and, based on the received identification information, configuring one or more interfaces of the plurality of predefined interfaces of the thermal module to establish communication with the subset of components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 10-1 is a representation of a temperature and power usage control system, according to at least one embodiment of the present disclosure;

FIG. 10-2 is a representation of examples of inputs for the control system of FIG. 10-1;

FIG. 10-3 is a representation of a user interface for the control system of FIG. 10-1;

FIG. 10-4 is another representation of the control system of FIG. 10-1;

FIG. 10-5 is yet another representation of the control system of FIG. 10-1;

FIG. 12-1 is a representation of a method for temperature and power usage control, according to at least one embodiment of the present disclosure;

FIG. 12-2 is a representation of a control system for the method of FIG. 12-1.

FIG. 13-1 is another representation of a method for temperature and power usage control, according to at least one embodiment of the present disclosure;

FIG. 13-2 is a representation of a control system for the method of FIG. 13-2;

FIG. 13-3 is a representation of examples of inputs for the control system of FIG. 13-1;

FIG. 13-4 is a representation of a user interface for the control system of FIG. 13-1;

FIG. 16 is a representation of a user interface for presenting and controlling thermal and power management in an electronic device.

DETAILED DESCRIPTION

The present disclosure relates generally to devices, systems, and methods for communicating between components of a computing device to manage power and thermal performance of the computing device. In some embodiments, devices, systems, and methods according to the present disclosure allow a computing device to survey the component devices of the computing device and create a registry and plurality of interfaces to communicate with and control the components. In some embodiments, the registry and plurality of interfaces allows two-way communication between the components to receive inputs from one or more components and provide outputs in response to one or more components.

In some embodiments, a computing device includes a plurality of components from a variety of manufactures or suppliers. In some embodiments, a user replaces or changes one or more components of the computing device. In some embodiments, a thermal module of the computing device is agnostic to the provenance of the components of the computing device. The thermal module can query the plurality of components upon startup or another triggering event to request and receive information from the components and dynamically create a registry of all components in the computing device with which the thermal module can communicate and control.

In some embodiments, a thermal module receives inputs from one or more components regarding temperature, power consumption, heat generation, performance or other data regarding the component. The thermal module or other software module or hardware device in data communication with the thermal module evaluates the inputs and, based on the inputs, the thermal module sends one or more outputs to one or more components. The outputs can set new power levels, thermal controls, or other performance settings.

Figure 1:
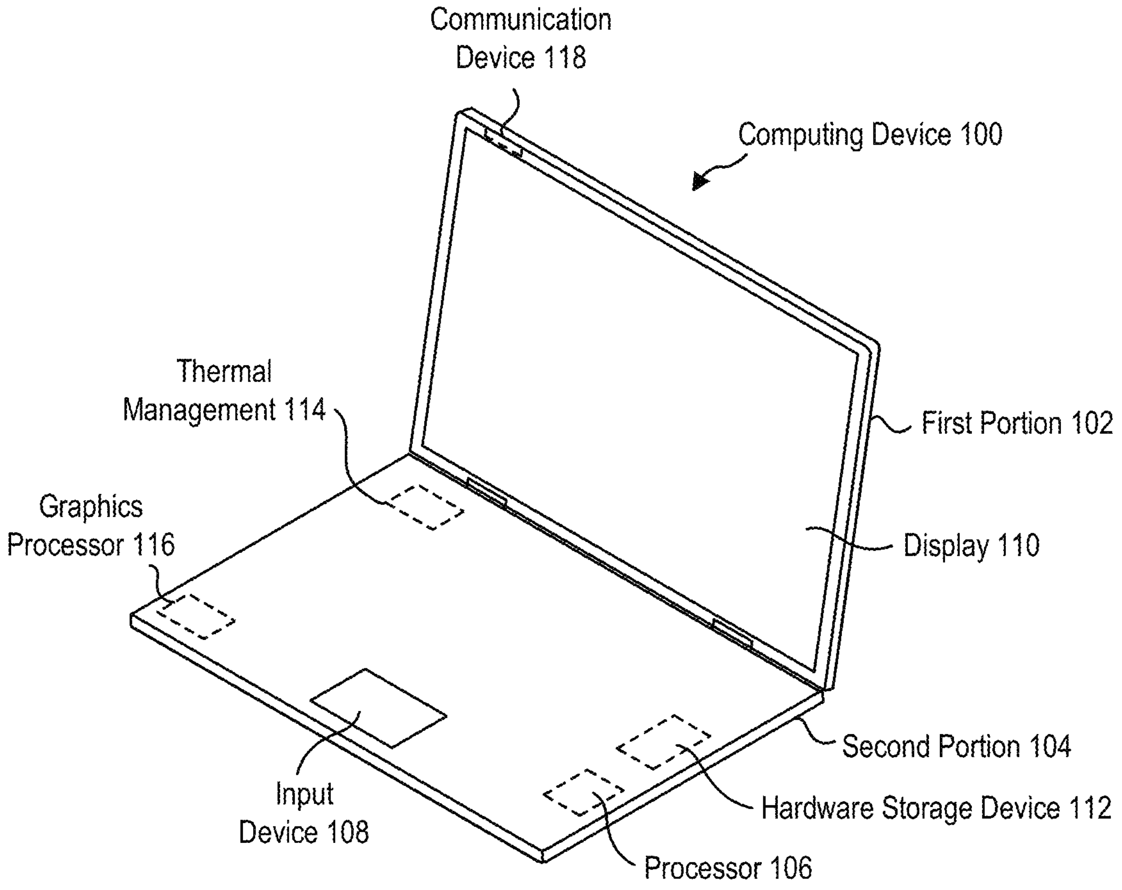
FIG. 1 is a perspective view of a computing device, according to at least one embodiment of the present disclosure.

FIG. 1 is a perspective view of an embodiment of a computing device according to the present disclosure. In some embodiments, the computing device 100 has a plurality of hardware components with which the thermal module communicates. In some embodiments, the computing device 100 is a laptop device as illustrated in FIG. 1. In some embodiments, the computing device is a tablet computing device, a hybrid computing device, a desktop computing device, a server computing device, a wearable computing device (e.g., a smartwatch, a head-mounted device, or other wearable device), a smart appliance (e.g., a smart television, a digital personal assistant or hub, an audio system, a home entertainment system, a home automation system, an in-car infotainment system), or other computer device.

In some embodiments, the computing device 100 has a first portion 102 and second portion 104 that are movably connected to one another. The computing device 100 includes various components located in or on the portions of the computing device 100 that are in data communication through one or more buses and interfaces. In some embodiments, the thermal module establishes and uses two-way communication with one or more of the components. Examples of components include a processor(s) 106, input device(s) 108, display(s) 110, hardware storage device(s) 112, thermal management device(s) 114, graphics processor(s) 116, communication device(s) 118, and other components.

In some embodiments, the processor(s) 106 is a central processing unit (CPU) that performs general computing tasks for the computing device 100. In some embodiments, the processor(s) 106 is or is part of a system on chip (SoC) that is dedicated to controlling or communicating with one or more subsystems of the computing device 100. In some embodiments, the processor 106 is in data communication with the hardware storage device 112 to execute instructions stored thereon that cause the processor 106 to perform any of the methods described herein.

In some embodiments, the input device(s) 108 is a mouse, a stylus, a trackpad, a touch-sensitive device, a touch-sensitive display, a keyboard, or other input human-interface device. In some embodiments, the input device(s) 108 is part of the computing device 100, such as a trackpad or a keyboard. In some embodiments, the input device(s) 108 is a discrete device in data communication with the computing device 100, such as a stylus in wireless data communication with the computing device 100.

In some embodiments, the display(s) 110 is a liquid crystal display (LCD), a light emitting diode (LED) display, a thin film transistor (TFT) display, a cathode ray tube (CRT) display, or other display. In some embodiments, the display 110 is integrated into the computing device 100, such as illustrated in the embodiment of FIG. 1. In some embodiments, the display 110 is a discrete monitor or other display that is in wired or wireless data communication with the computing device 100.

In some embodiments, the hardware storage device(s) 112 is a non-transient storage device including any of RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

In some embodiments, the thermal management device(s) 114 includes passive thermal management, such as vapor chambers, heat pipes, heat spreaders, fins, meshes, or other passive heat dissipation or transport devices; or active thermal management, such as a fan, liquid cooling, solid-state (e.g., Peltier) cooling, or other active heat dissipation or transport devices. In some embodiments, the thermal management device(s) 114 includes temperature measurement devices, such as thermocouples or thermistors, that measure and report temperature information from one or more locations of the computing device 100. In some embodiments, other components of the computing device 100 include temperature measurement devices as well.

In some embodiments, the graphics processor(s) 116 is discrete from the CPU or other processor 106 and is in data communication with the CPU or other processor 106. In some embodiments, the graphics processor(s) 116 is integrated with (e.g., on a shared die with) another processor 106.

In some embodiments, the communication device(s) 118 is in data communication with the processor(s) 106 to allow communication with one or more external computing devices, networks, or components. In some embodiments, the communication device is a network communications device, such as including a wired (e.g., Ethernet) port or wireless (e.g., WiFi) antenna. In some embodiments, the communication device is a short-range wireless communication, such as a BLUETOOTH connection or a WiFi-Direct connection, that allows data communication between the computing device 100 and electronic devices in proximity to the computing device 100. In some embodiments, the communication device is a near-field communications (NFC) device that is used for data communication, wireless charging of other components and/or accessory devices, or both.

Figure 2:
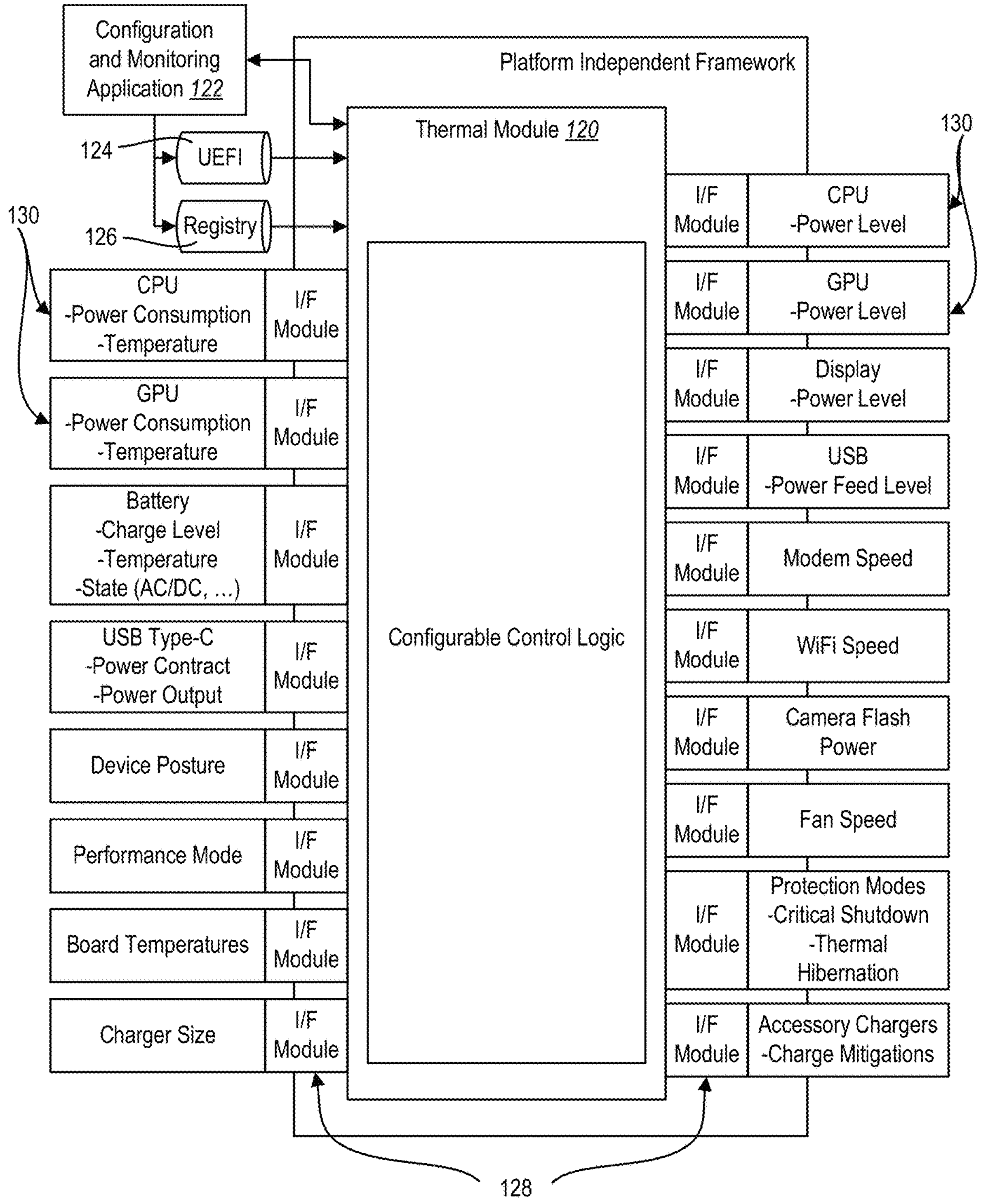
FIG. 2 is a schematic representation of a thermal module and interfaces with a plurality of components, according to at least one embodiment of the present disclosure.

In some embodiments, to provide silicon-agnostic system controls, a thermal module communicates with a unified extensible firmware interface (UEFI), a registry, or a file to read a system configuration or other list of available components of the computing device 100. In some embodiments, the system configuration includes information regarding processing procedures for input interface data and mapping of input interface data to output interfaces. In some embodiments, one or more potential components are detected by monitoring component and/or device connections through an operating system of the computing device. FIG. 2 illustrates a system diagram of the communication pathways and interfaces of an embodiment of a thermal module.

In some embodiments, a thermal module 120 communicates with a configuration and monitoring application 122 to receive information from the UEFI 124 and Registry 126. The UEFI and Registry 126 provide information to the thermal module 120 regarding the plurality of known potential components in the computing device (e.g., computing device 100 of FIG. 1). In some embodiments, the thermal module 120 then sends a request to each of the potential components, and upon receiving a valid response back from the potential component, assigns the component to an interface 128. In some embodiments, the thermal module 120 receives an invalid response or no response from the component and does not assign that component to an interface 128. An invalid response or no response may indicate that the component is not compatible with the thermal module or with other components of the computing device. In some embodiments, an incompatible device is unable to provide inputs to or receive outputs from the thermal module 120. In some embodiments, potential components include a processor(s), graphical processing unit(s) (GPUs), fan(s), thermal management device(s), thermal sensor(s), battery (batteries), battery management unit(s), display(s), communication device(s), input device(s), speaker(s), etc.

In some embodiments, the response from the component includes a globally unique identifier (GUID) that allows the thermal module 120 to uniquely identify that component and assign the component 130 to an interface 128. In some embodiments, the response includes an instance identification (ID) that uniquely identifies the instance. The GUID and instance ID are used to create a unique interface assignment for the current system configuration of the computing device. In some embodiments, the thermal module 120 creates a directory of available components 130 of the computing device. In some embodiments, the directory is stored in memory within the thermal module 120. In some embodiments, the directory is stored within hardware storage device 112. The directory can be used to reestablish the interfaces 128 with components 130 in future sessions.

In some embodiments, the thermal module 120 communicates with a plurality of interfaces 128 to which the plurality of potential components 130 are assigned. In some embodiments, each potential component 130 is assigned to a distinct interface. In some embodiments, a group of components 130 are assigned to a single interface 128 to receive inputs from the group collectively and to send outputs to the group collectively. In some embodiments, a component 130 is assigned to an interface based upon the GUID and the instance ID and the thermal module 120 assigns a tag to the interface with which the thermal module 120 communicates.

In some embodiments, the response from the component 130 includes information relating to one or more capabilities of the component 130. In some embodiments, a capability includes a reporting capability. In some embodiments, a capability includes a control capability. For example, a CPU component 130 may have a power consumption reporting capability, a temperature reporting capability, and a clock speed control capability. The thermal module 120 can receive inputs from the CPU component 130 related to power consumption and temperature of the CPU and send outputs to the CPU component 130 to control the clock speed.

In some embodiments, the thermal module 120 contains configurable control logic that enables any-to-any control mechanisms based on the capabilities reported by the components in the responses. The thermal module 120 can, therefore, receive one or more inputs from one or more components 130, evaluate the inputs and determine whether mitigation or intervention is needed, and send an output to one or more components to respond to the inputs.

In some embodiments, the one or more output components (e.g., the one or more components receiving an output from the thermal module 120) and the one or more input components (e.g., the one or more components providing an input to the thermal module 120) are different. For example, a plurality of processors (e.g., the CPU and GPU), the motherboard, and the battery may each report a temperature to the thermal module 120, and the thermal module 120 can send an output to the fan to increase speed.

In some embodiments, the one or more output components and the one or more input components are the same. For example, the thermal module 120 receives temperature inputs from the CPU and GPU, and the thermal module 120 sends clock speed outputs to the CPU and GPU.

In some embodiments, at least one of the one or more output components and the one or more input components is the same. For example, the thermal module 120 receives a power consumption input from the CPU and GPU and charge level and charge rate inputs from the battery, and the thermal module 120 sends a power level or brightness output to the display and a clock speed output to the GPU.

In some embodiments, the thermal module 120 requests information from the one or more components 130 through the interfaces 128 and pulls inputs from the components 130. In some embodiments, the thermal module 120 pulls input values at a first rate when the input value is above a threshold value and at a second rate when the input value is below a threshold value. For example, when the CPU temperature is in a safe range of values, such as below 120° C., the thermal module 120 polls the CPU component 130 at a first rate, and when the reported CPU temperature exceeds the threshold value, such as exceeding 120° C., the thermal module 120 polls the CPU component 130 at a second rate that is greater than the first to monitor the CPU temperature more frequently.

In some embodiments, the thermal module 120 sends configuration instructions (e.g., a configuration file) to a component 130 to set reporting parameters from the component 130 to the thermal module 120. The configuration instructions may instruct the component 130 to report one or more inputs (e.g. push one or more inputs) to the thermal module 120 in an event-based mode. For example, the component may be set to send inputs to the thermal module 120 upon a value change of the component.

In some embodiments, the configuration instructions instruct the component 130 to report one or more inputs when a reported value (e.g., temperature, power consumption, state of charge) crosses a threshold value. In some embodiments, the configuration instructions instructs the component 130 to report one or more inputs when a reported value (e.g., temperature, power consumption, state of charge) crosses a threshold value and the thermal module continues to poll the component until the reported value is within the threshold value.

Figure 3:
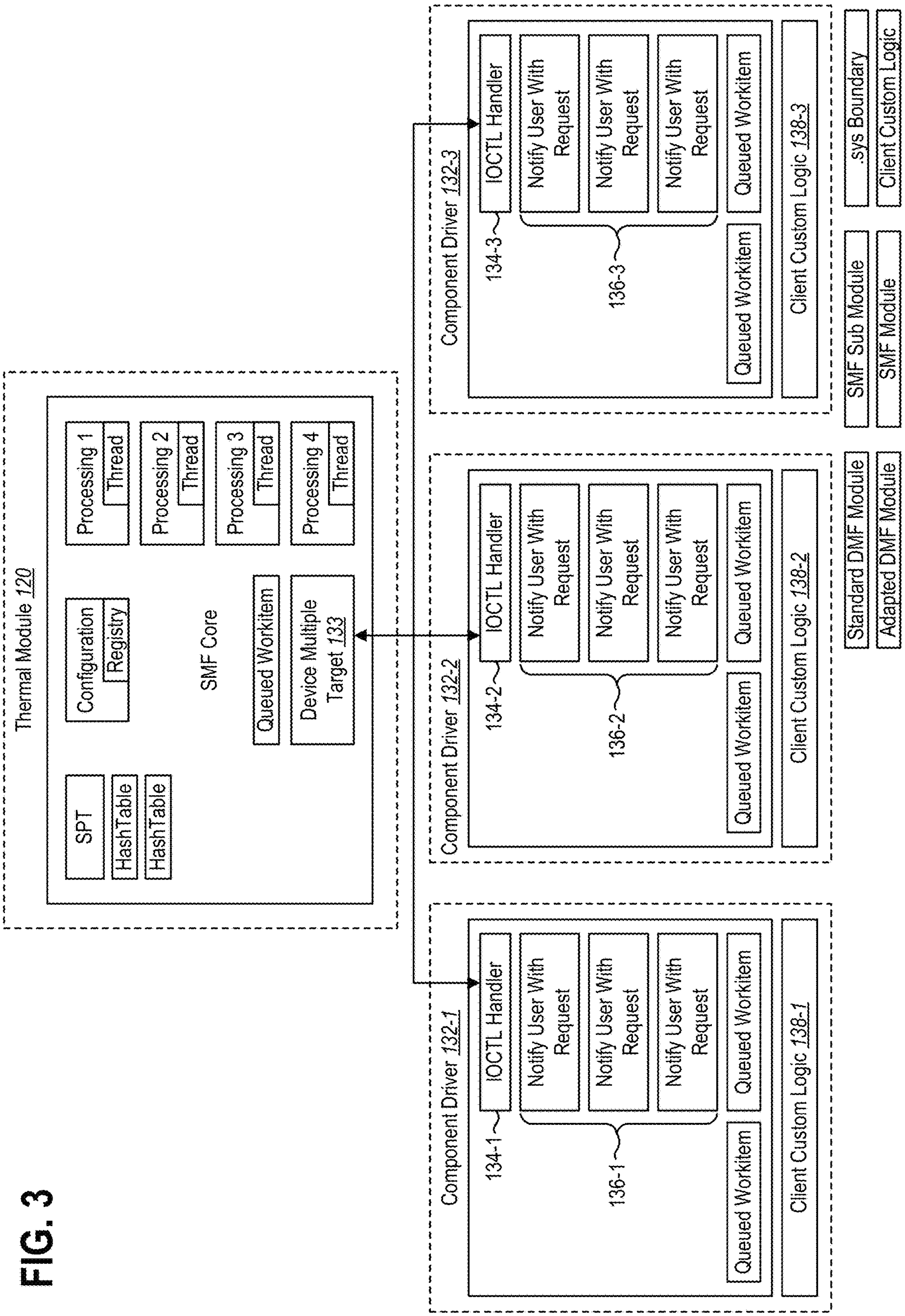
FIG. 3 is a system diagram of nested modules in a thermal module and interfaced components, according to at least one embodiment of the present disclosure.

Referring now to FIG. 3, in some embodiments, the thermal module 120 can utilize existing driver module framework (DMF) information or modules. The thermal module 120 can communicate with the components by using existing DMF modules of the component drivers. For example, the component drivers 132-1, 132-2, 132-3 include existing DMF modules that can be used without modification or with modification to provide communication with the thermal module 120. By reusing the existing DMF modules, embodiments of a thermal module 120 according to the present disclosure can communicate with components without preloading of modules.

In some embodiments, a modified DMF communication module 133 is used by the thermal module 120 to communicate with the component drivers 132-1, 132-2, 132-3. In some embodiments, the modified DMF communication module 133 allows communication with a plurality of components at the same time. The component drivers 132-1, 132-2, 132-3 similarly use a modified DMF module 134-1, 134-2, 134-3 to manage communications to and from the thermal module 120. In some embodiments, the component drivers 132-1, 132-2, 132-3 utilize unmodified DMF modules 136-1, 136-2, 136-2.

In some embodiments, the configuration file or other file sent by the thermal module 120 can load custom logic 138-1, 138-2, 138-3 on the component drivers 132-1, 132-2, 132-3 that provides information and/or inputs to the thermal module 120. In some embodiments, the configuration file or other file sent by the thermal module 120 can load custom logic on the component drivers 132-1, 132-2, 132-3 that provides information and/or inputs to the thermal module 120.

Figure 4:
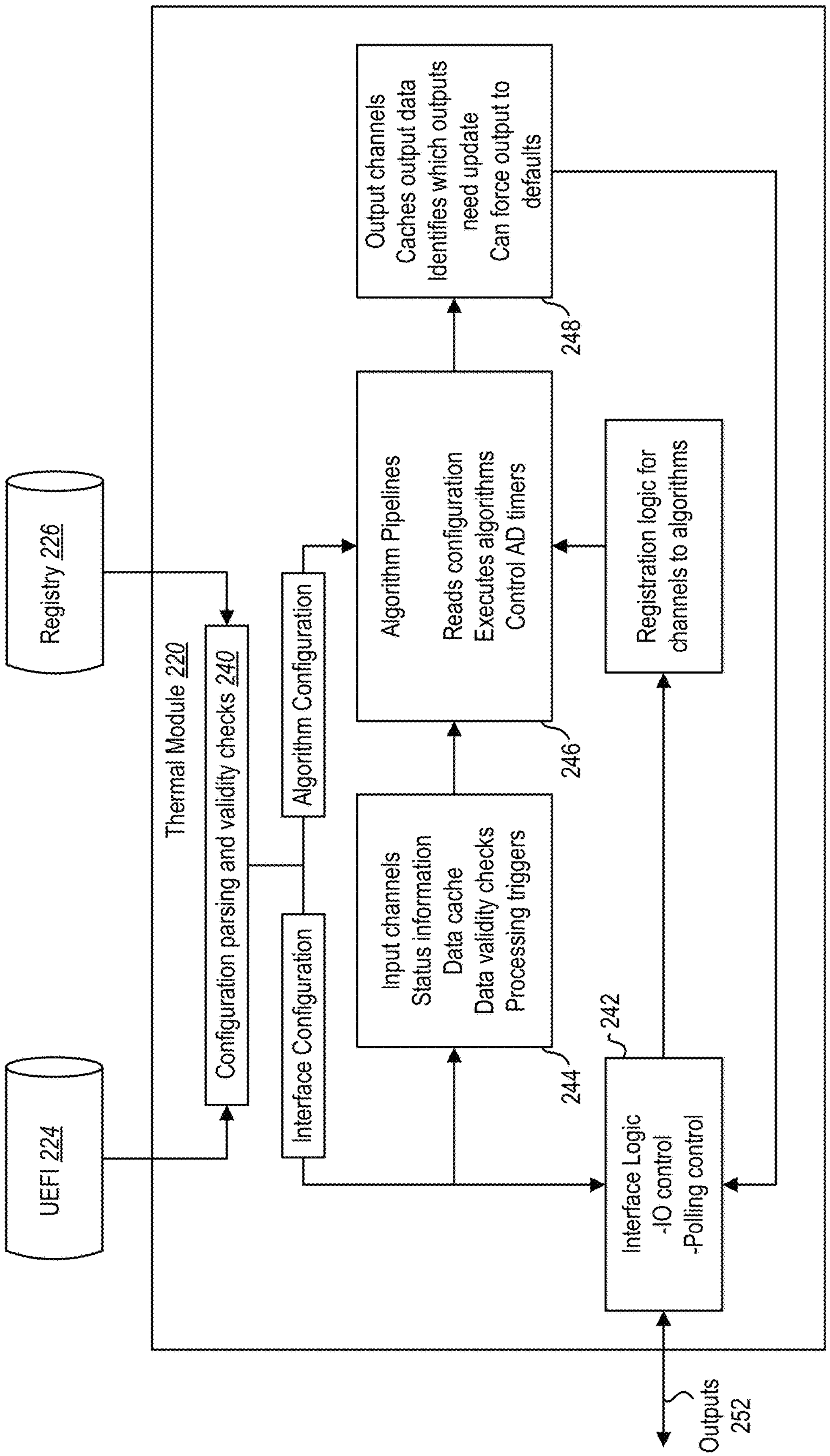
FIG. 4 is a flowchart illustrating a method of thermal and power control in a computing device, according to at least one embodiment of the present disclosure.

FIG. 4 is a system flowchart of an embodiment of a thermal module 220 accessing a UEFI 224 and a Registry 226. The UEFI includes channel configurations having GUIDs and instance IDs. The UEFI also contains algorithm GUIDs and Input and Output GUIDs to allow the thermal module to uniquely identify components and communications with the components of the computing device.

In some embodiments, after reading the UEFI 224 and the Registry 226, the thermal module 220 parses the configuration information and checks the validity of the component information and communication 240. The thermal module 220 can then configure the plurality of interfaces to communicate with the components of the computing device. In some embodiments, the thermal module 220 establishes the interface logic 242 that provides input/output control and sets the reporting parameters with the components.

In some embodiments, the thermal module 220 further establishes the input channels 244 to receive input information regarding component statuses and operating conditions. In some embodiments, the input channels 244 perform data validity checks and data caches for the received inputs. The input channels 244, with the interface logic 242, provide information to the algorithm pipelines 246, which evaluate the input information and configuration to determine the outputs and the components to receive the outputs. In some embodiments, the output channels 248 determine whether or not the output needs to be sent to a component and subsequently provides the output(s) 252 to the intended component via the interface logic 242.

Figure 5:
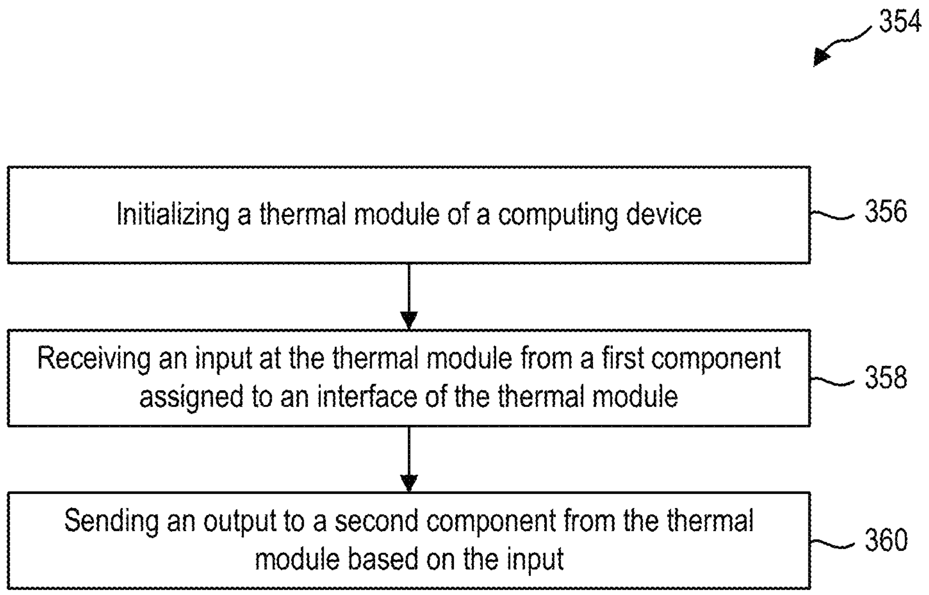
FIG. 5 is a flowchart illustrating another method of thermal and power control in a computing device, according to at least one embodiment of the present disclosure.
Figure 6:
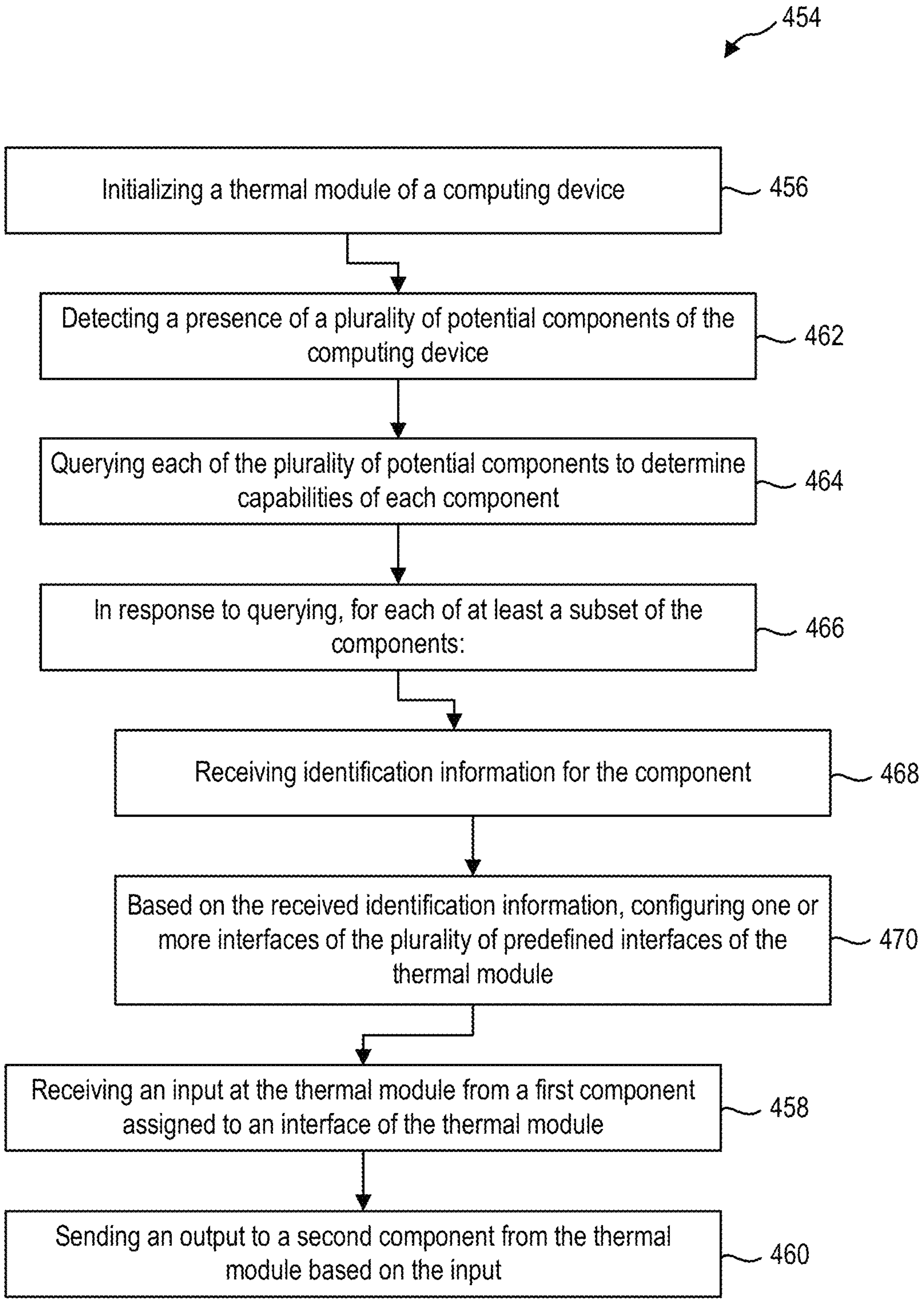
FIG. 6 is a flowchart illustrating a method of initializing thermal and power control in a computing device, according to at least one embodiment of the present disclosure.

While computing devices and systems have been described herein, FIGS. 5 and 6 illustrate flowcharts of methods of thermal and power control in a computing device, according to the present disclosure. In some embodiments, a method 354 includes initializing (356) a thermal module of a computing device, as described herein. In some embodiments, the computing device is a laptop computing device, a tablet computing device, a hybrid computing device, a desktop computing device, a server computing device, a wearable computing device (e.g., a smartwatch, a head-mounted device, or other wearable device), a smart appliance (e.g., a smart television, a digital personal assistant or hub, an audio system, a home entertainment system, a home automation system, an in-car infotainment system), or other computer device. In some embodiments, the thermal module is in two-way data communication with a plurality of components of the computing device.

The method further includes receiving (358) an input at the thermal module from a first component assigned to an interface of the thermal module. The thermal module applies an algorithm to the input(s) and determines whether an output needs to be sent to a component of the computing device. If the thermal module determines that the output is to be sent, in some embodiments, the method further includes sending (360) an output to a second component from the thermal module. In some embodiments, the first component and the second component are the same component. In some embodiments, the first component and second component are different components.

FIG. 6 illustrates another method 454 of thermal and power control in a computing device. In some embodiments, the method includes initializing (456) a thermal module of a computing device, receiving (458) an input at the thermal module from a first component assigned to an interface of the thermal module, and sending (460) an output to a second component from the thermal module similar to as described in relation to FIG. 5.

In some embodiments, initializing (456) a thermal module includes detecting (462) a presence of a plurality of potential components of the computing device and querying (464) each of the plurality of potential components to determine capabilities of each component. In some embodiments, detecting the presence of the plurality of potential components includes reading a UEFI and/or Registry. In some embodiments, detecting the presence of the plurality of potential components includes monitoring component connections or changes in component connections through an operating system of the computing device.

In some embodiments, in response to querying (466) each of the plurality of potential components, the method includes receiving (468) identification information for the component for at least a subset of the components and configuring (470), based on the received information, one or more interfaces of the plurality of predefined interfaces of the thermal module to establish communication with the subset of components. After initializing the thermal module, the thermal module may receive inputs and send outputs, in accordance with the descriptions herein.

Figure 7:
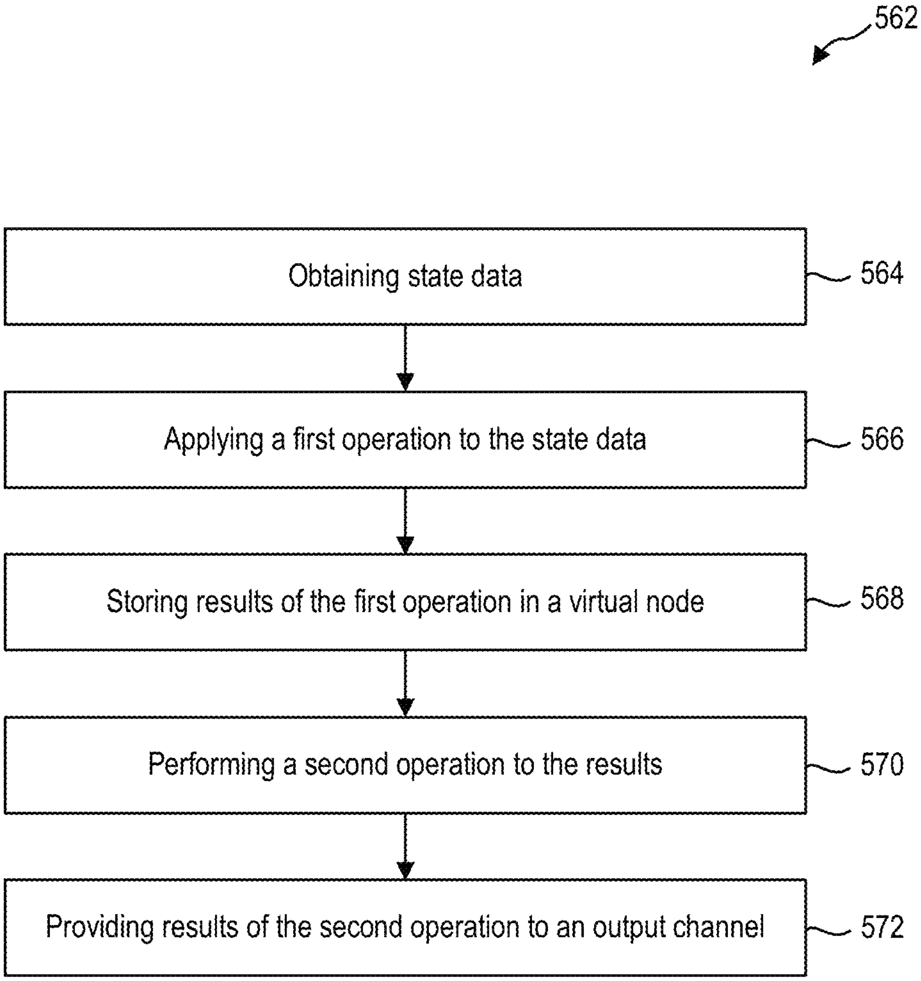
FIG. 7 is a representation of a method for temperature and power usage control, according to at least one embodiment of the present disclosure.

FIG. 7 is a representation of a method 562 for controlling temperature and/or power limit of a computing device (e.g., computing device 100 of FIG. 1), according to at least one embodiment of the present disclosure. The method 562 may be performed by a thermal module, e.g., thermal algorithm(s) operating in conjunction with a processor and/or control circuitry of the device. The method 562 includes obtaining state data about the computing device at 564. The state data may include: device posture; device lid state; operating system slider location; mixed reality or kiosk activity activation; measured temperatures; virtual (e.g., computed or determined) temperatures; battery state of charge; power source unit presence; power source unit size; display backlight power; battery charge rate; battery discharge rate; battery fuel gauge; battery capacity; and combinations thereof. The state data may be obtained from one or more components of the computing device. The state data may be obtained from memory of the computing device. The state data may also include information about user preferences, user settings, and/or past behavior and usage patterns of the user. For example, the state data may include a user preference for device skin temperature that may be lower for users that consistently use the device in contact with their skin and higher for users that user the device on a desk and desire greater performance. As another example, the state data may include information about how often the user tends to keep the device unplugged. This information may be used to control battery discharge rates so as to help ensure the user has insufficient charge levels during anticipated unplugged times.

The method 562 includes applying (566) a first operation to the state data. The first operation may include a mathematical operation, a memory operation, and/or other computer operation(s). For example, the first operation may include accessing a lookup table. The input for the lookup table may be the collected state data. The lookup table may then reference an output value based on the input. For example, the state data may include power supply unit size. The power supply unit size may be inputted into the lookup table, and the output of the lookup table may include an indication of whether the power supply unit is present.

The results from the first operation are stored (568) in a virtual node. The virtual node is a location to store the results of the first operation to be collected and used at a later time. The virtual node corresponds to a location in memory of the device, such as within a hard drive, random-access memory (RAM), latch, or flip-flop of the device. In this manner, the results of the first operation may be used in many different subsequent operations and may be applied to many different types of computing components, regardless of the manufacturer of the computing component. Thus, the control system, using the state data collected and operated on by the first operation, may store the results of the first operation in a virtual node and may use that data in subsequent operations.

A second operation may be performed (570) on the results of the first operation stored in the virtual node. The second operation may be any operation, such as initiation of a PID controller, a multiplexing operation (using input from multiple virtual nodes), a minimum select function, or any other operation. The results of the second operation may be stored (572) in another virtual node and/or provided to an output channel. For example, the second operation may determine a computing component power setpoint, and the output channel may use the computing component power setpoint to limit the power limit of a computing component. Thus, the method 562 may use received state data to control the power limit of a computing component. This may help to regulate the temperature and/or power limit of a computing device. This may improve the performance of the computing device by increasing the battery life and/or improving the performance of the processors.

Figure 8:
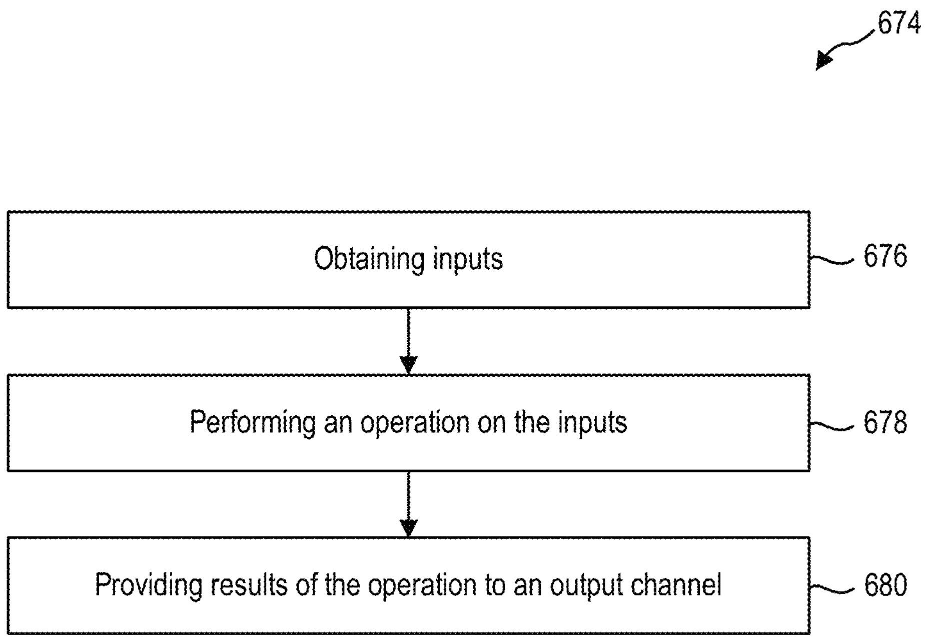
FIG. 8 is another representation of a method for temperature and power usage control, according to at least one embodiment of the present disclosure.

FIG. 8 is a representation of a method 674 for controlling temperature and/or power limit of a computing device, according to at least one embodiment of the present disclosure. The method 674 may be performed by a thermal module, e.g., thermal algorithm(s) operating in conjunction with a processor and/or control circuitry of the device. The method 674 includes obtaining (676) inputs that are stored in a virtual node. The inputs may be any of the results of an operation discussed above with reference FIG. 7 or any other Figure herein. For example, the inputs may include a maximum computing component power limit value. In other examples, the inputs are the determination of the presence of a power control unit.

In some embodiments, the received inputs then have an operation performed (678) on them. The operation may include any operation. In some embodiments, the operation is initiation of a PID control loop, used to control the battery discharge. In some embodiments, the inputs are a virtual temperature value, and the operation may be accessing a lookup table to produce an output instruction for a solid-state drive. The results of the operation (e.g., the output instructions) are then provided (680) to an output channel. The output channel directs the results to the solid-state drive or to a control system, such as a system used to throttle a solid-state drive or control the power limit of the solid-state drive.

Figure 9:
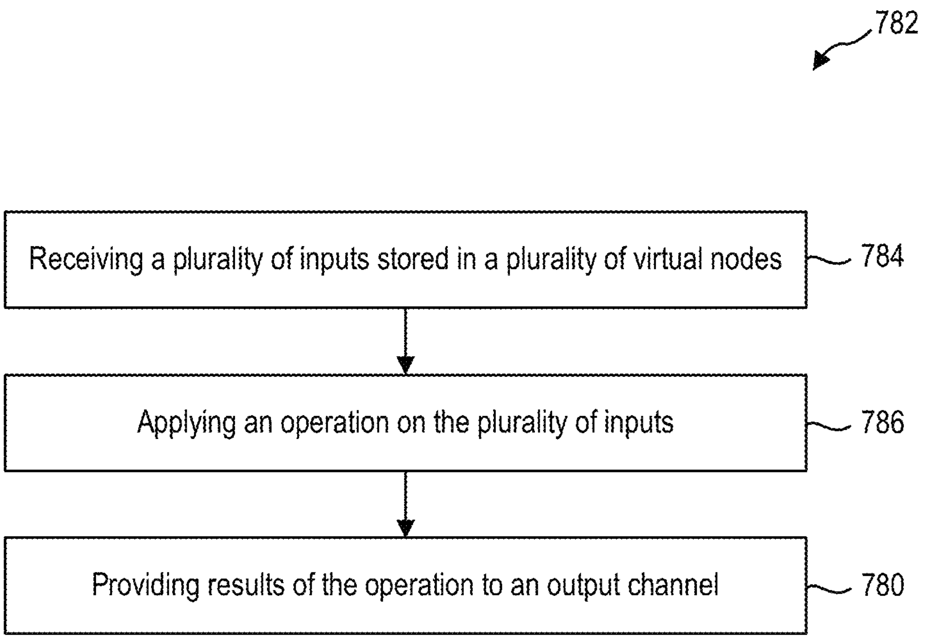
FIG. 9 is a representation of a method for temperature and power usage control, according to at least one embodiment of the present disclosure.

FIG. 9 is a representation of a method 782 for controlling temperature and/or power limit of a computing device, according to at least one embodiment of the present disclosure. The method 782 may be performed by a thermal module, e.g., thermal algorithm(s) operating in conjunction with a processor and/or control circuitry of the device. The method 782 includes obtaining a plurality of inputs stored in a plurality of virtual nodes at 784. The virtual node inputs may include the results of previously executed operations. An operation may be performed on the plurality of inputs at 786. The operation may be any operation that utilizes a plurality of inputs. For example, the operation may be a multiplexer, which exports a single value based on the entirety of the values. In some examples, the operation may be a minimum-select operation. A minimum-select operation selects the minimum value of a set of values. In this case, if a plurality of computing component power limit values were input into the minimum-select function, the function would output the lowest computing component power limit.

The results of the operation are provided to an output channel at 780. The output channel may use the results to control a component of a computing device. For example, the output channel may reduce the power limit of a processor based on a component power limit output. In this manner, the method 782 may provide an arbitration between many different inputs and elements of a computing device. This arbitration may be easily changed and adjusted to match different inputs. Virtual nodes may be added or removed from the operation, without changing the function or parameters of the operation. In this manner, the method 782 maybe agnostic as to from where the input comes (e.g., each input comes from a virtual node, and the specific input data source that feeds the virtual node does not have to be considered in the operation).

Conventionally, temperature and power limit control systems are specially programmed into individual processors, or the processors of individual manufacturers. Programming these control systems is time consuming and expensive. Furthermore, the programmer is limited to the structure provided by the manufacturer to program the control system. The method 782 outlines a control system process which may be applied to any processor, regardless of the manufacturer or any pre-programmed instructions. This allows the user and/or the developer to customize and manage the temperature and power limit control systems to suit multiple processors and other computing components. This may save time and/or money, increase uniformity across devices, and improve reliability.

Below are representations of use cases of the temperature and power limit control systems, according to embodiments of the present disclosure.

Use Case 1: Brownout Control

In some embodiments, a computing device may be able to use more power than a power supply cable can provide. If this is the case, the computing device may draw power from the battery to receive the rest of the power. If the battery is drained but the computing device remains plugged in with an insufficient power supply, then the computing device cannot adequately perform necessary functions. This may be considered a brownout condition.

Figures 1, 10:
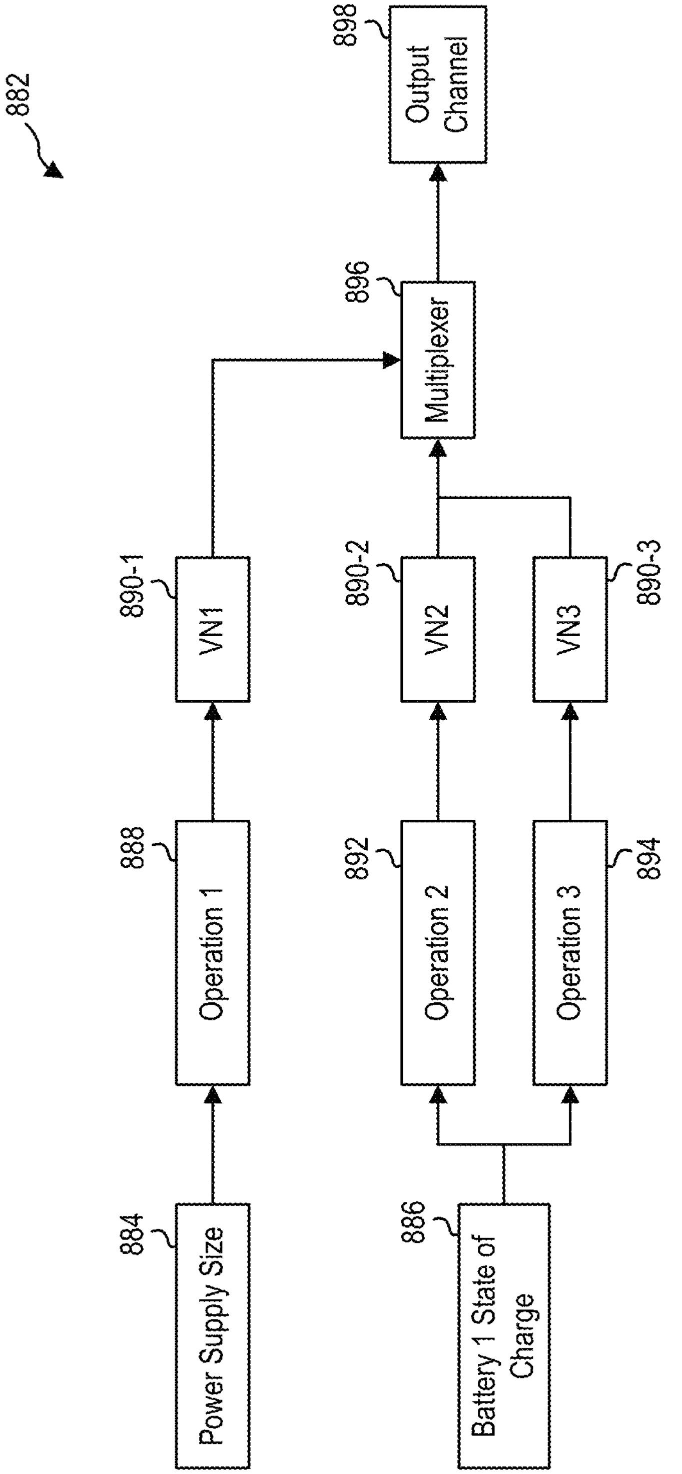
Figures 4, 10:
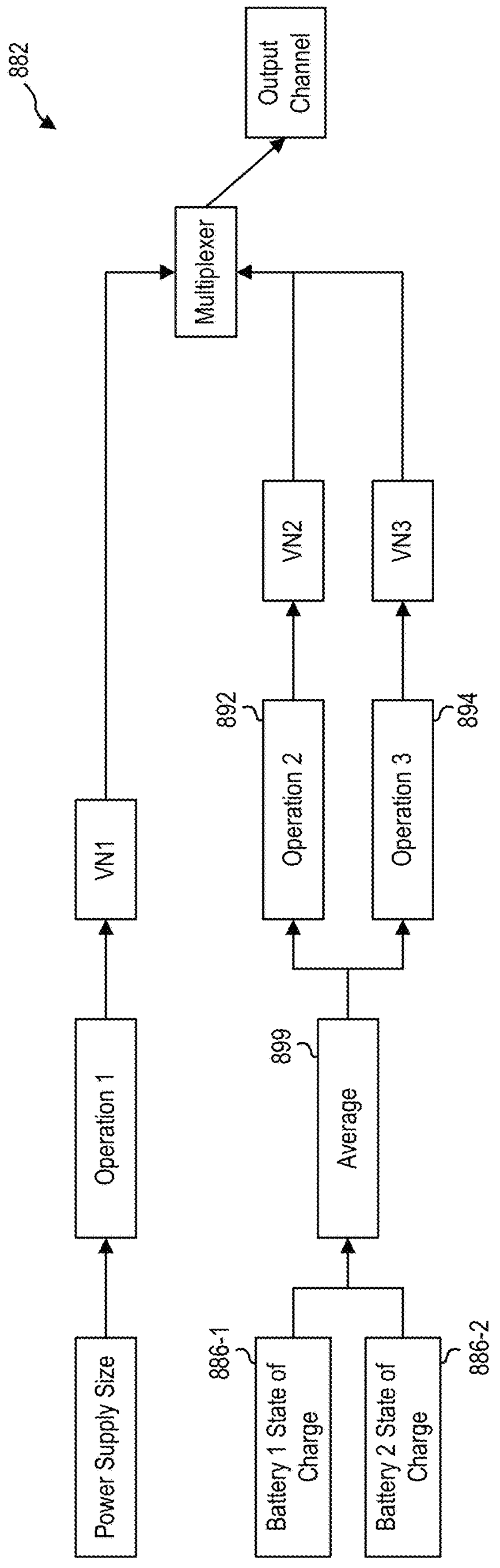
Figures 5, 10:
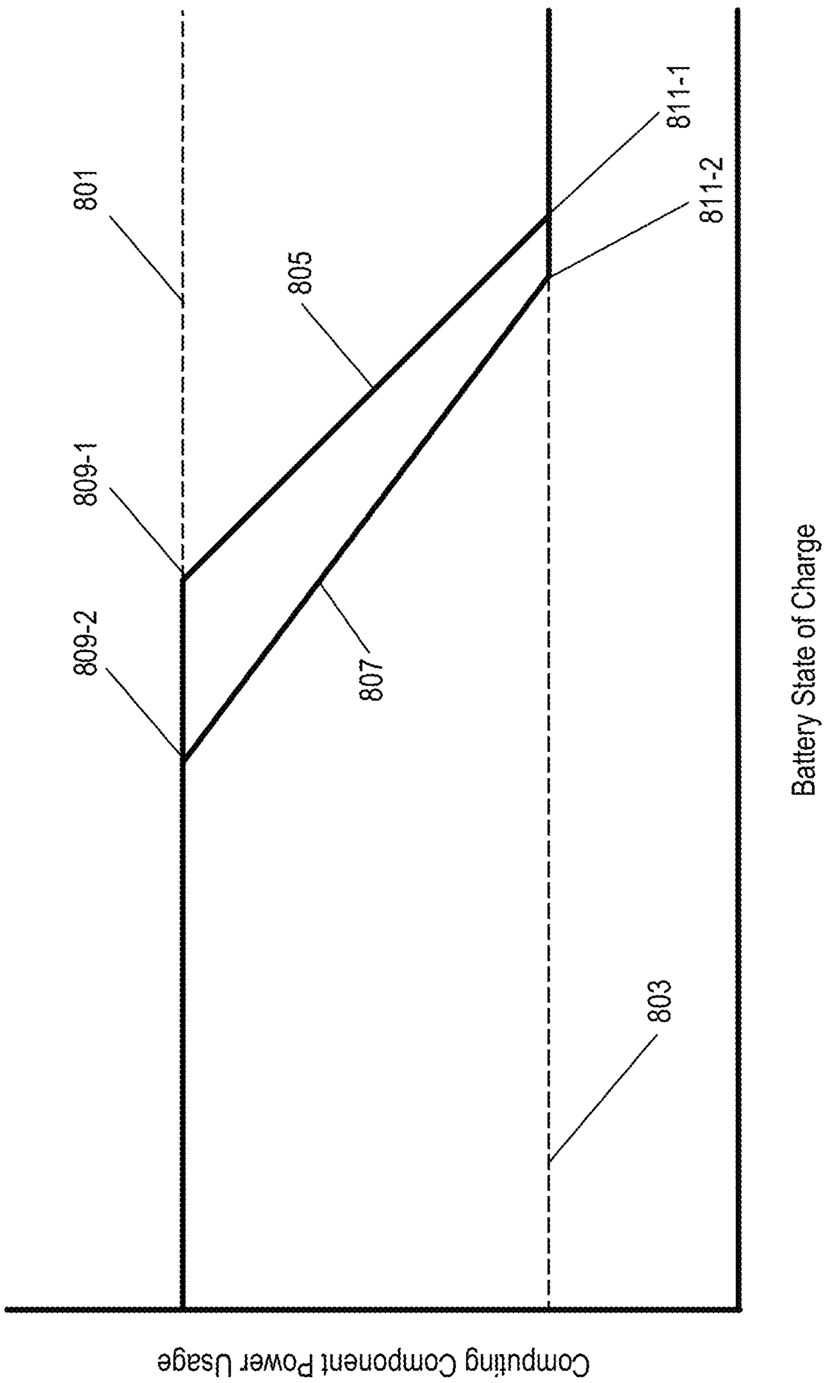

FIG. 10-1 is a representation of a temperature and power limit control system 882, according to at least one embodiment of the present disclosure. The control system 882 includes state data inputs, including inputs for a power supply size 884 and a battery state of charge 886. The power supply size input 884 may be a representation of the capacity of a power cord connected to the computing device. The battery state of charge input 886 is an indication of the remaining charge in a battery. The battery state of charge may include the amount of mWh left in the battery, or may be a relative state of charge, which is a percentage of the power left in the battery.

A first operation 888 is performed on the power supply size input. For example, the first operation 888 may be accessing a lookup table. The lookup table may indicate whether the power supply is present or may categorize the power supply size as one of several power supply size categories. The results of the first operation 888 are stored in a first virtual node 890-1.

A second operation 892 and a third operation 894 are performed on the battery state of charge input. The second operation 892 and the third operation 894 may be implementing linear equations. The difference between the second operation 892 and the third operation 894 may be the assumption of whether a power supply is present or not. For example, the second operation 892 may be an equation that determines a computing component power limit necessary to prevent a brownout based on the battery state of charge assuming a power supply is present. The third operation 894 may be an equation that determines a computing component power limit necessary to prevent a brownout based on the battery state of charge assuming a power supply is not present. The results of the second operation 892 are stored in a second virtual node 890-2 and the results of the third operation are stored in a third virtual node 890-3.

A multiplexer 896 may perform an operation on the results stored in the first virtual node 890-1, the second virtual node 890-2, and the third virtual node 890-3. Based on these inputs, the multiplexer 896 may output a computing component power limit to prevent a brownout condition. For example, if the power supply unit is not present, then the multiplexer would output the computing component power limit from the third virtual node 890-2. This result is then provided to an output channel 898, which may limit the power limit of a computing component to the specified value, thereby preventing a brownout on the computing device.

FIG. 10-2 is a representation of examples of the operations of the control system 882 of FIG. 10-1. For example, Table 10.1 is an example of the lookup table described as an example for the first operation 888. Thus, if a power source size is zero, the output is zero, if the power source size is between 1 and 150000 mW, then a power source is detected, and the output is 1. If the power source size is outside of this range, then the output is assumed to be zero (e.g., not present).

Table 10.2 is an example of the inputs and legend for a linear equation used in the second operation 892. The slope of the linear equation is the relationship between the state of charge 886 and the power limit.

A user interface may provide a way for the user to modify and/or change the parameters used in the control system 882. FIG. 10-3 is a representation of a user interface, where the user may change values to affect the slope of the linear relationship between the state of charge 886 and the power limit. In this way the user may adjust how quickly the battery is drained. The user interface may also be used to display virtual node data to the user, allowing the user to identify potential problems and take corrective action.

FIG. 10-4 is a representation of the control system 882 for a computing device having two batteries. In the embodiment shown, a first battery state of charge 886-1 and a second battery state of charge 886-2 are received as state data inputs. The first battery state of charge 886-1 and the second battery state of charge 886-2 are averaged 899. In some embodiments, the average 899 is a geometrical average. In some embodiments, the average 899 is a weighted average based on battery capacity. The output of the average 899 may then be used in the second operation 892 and the third operation 894 to determine a computing component power limit. This may allow multiple batteries to be taken into consideration when preventing brownouts.

FIG. 10-5 is a representation of a graph of computing component power limit with respect to battery state of charge. This graph may be a visualization of the second operation 892 and the third operation 894. In this example, the computing component has a maximum power limit 801. This is the maximum power limit for the computing component. The computing component may have a minimum power limit 803. This is the minimum computing component power limit, below which performance of the computing component is deemed unacceptable. A first curve 805 represents the second operation, e.g., the computing component power limit assuming a power source is present. A second curve 807 represents the third operation, e.g., the computing component power limit assuming a power source is not present.

Above a battery state of charge threshold (collectively 809), the computing component operates at the maximum power limit 801. The battery state of charge threshold 809 may be different for the first curve 805 and the second curve 807. For example, if the power source unit is present, then a first battery state of charge threshold 809-1 may be lower than a second battery state of charge threshold 809-2 assuming the power source unit is not present. This is because, if a power source unit is present, the battery may not be drained as quickly.

Below a battery state of charge limit (collectively 811), the computing component operates at the minimum power limit 803. The battery state of charge limit 811 may be different for the first curve 805 and the second curve 807. For example, if the power source unit is present, then a first battery state of charge limit 811-1 may be lower than a second battery state of charge limit 811-2 assuming the power source unit is not present. This is because, if a power source unit is present, the battery may not be drained as quickly, and can reach a lower state of charge before reducing the power limit. By following the curves 805 and 807, the first operation and the second operation may help provide a computing component power limit to prevent a brownout.

Use Case 2: Posture Determined Thermal Runaway Protection

In some embodiments, a computing device may be changeable between different postures, configurations, modes, or other physical positions. For example, a computing device may include a laptop mode, an airplane mode, a tablet mode, a closed mode, and other modes. Different postures may have different thermal properties. For example, tablet mode, where a keyboard is rotated until it is contacting the rear surface of a display, may close vents and/or reduce the heat dissipation efficiency of the computing device.

In some embodiments, if the heat dissipation of the computing device is reduced, then the temperature of the computing device may increase. In some embodiments, the temperature of the computing device may be increased such that the thermal controls in the computing device may be unable to lower the temperature of the computing device. This may cause the temperature to further increase, which may damage or otherwise impair performance of the computing device. This may be called thermal runaway.

Figure 11:
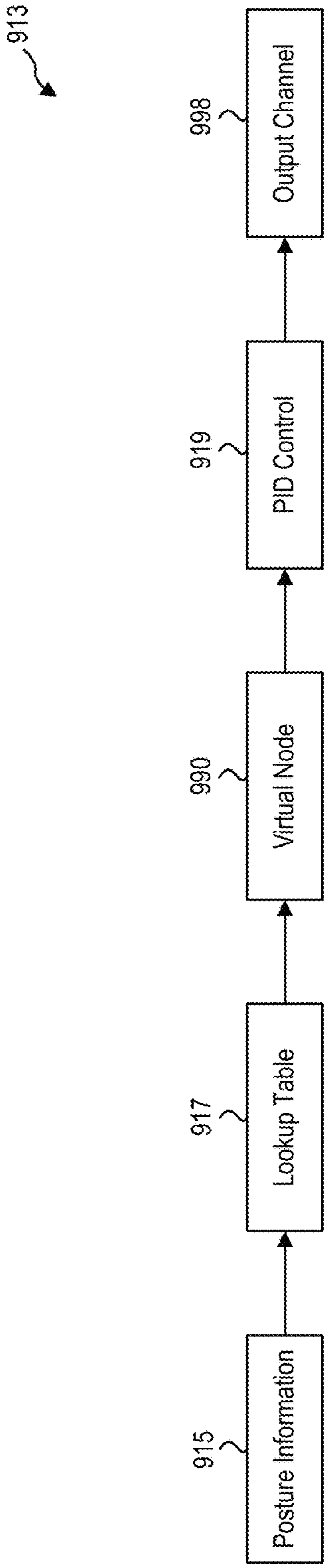
FIG. 11 is a representation of a temperature and power usage control system, according to at least one embodiment of the present disclosure.

FIG. 11 is a representation of a control system 913 for controlling temperature and/or power limit based on posture, according to at least one embodiment of the present disclosure. Initially, an existing PID loop 919 may be controlling computing component power limit. The PID loop may have a power limit threshold, which may be the maximum power limit for a computing component. Posture information 915 is received as a state data input. The posture information 915 is inputted into an operation, such as the lookup table 917.

The lookup table 917 may determine a computing component power limit based on the received posture information 915. These results may be stored in a virtual node 990. The results stored in the virtual node 990 may be accessed by the PID control loop 919. If the computing component power limit has changed, the PID control loop 919 may output the computing component power limit to an output channel 998, which may change the maximum power limit for the computing component. In this manner, as the user changes the posture of the computing device, such as from the laptop mode to the closed mode, the PID control loop 919 may change the power limit of the computing component. This may help to prevent a thermal runaway.

Use Case 3: Adaptively Manage Underpowered Computing Components

Figures 1, 12:
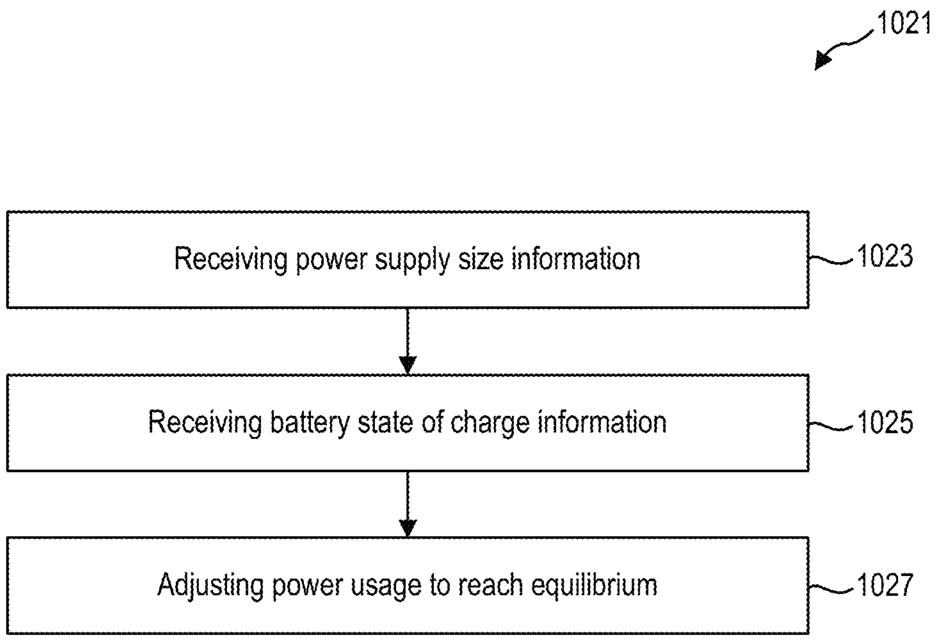
Figures 2, 12:
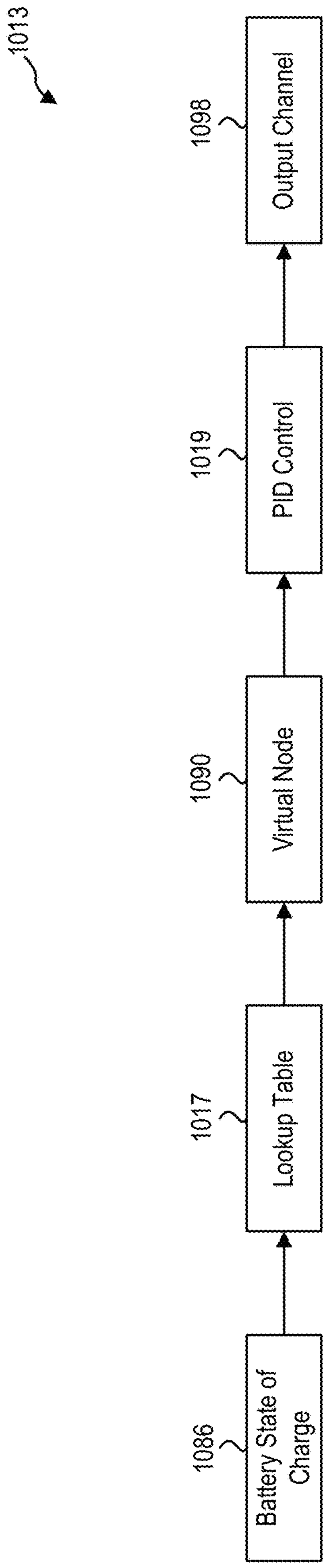

In some embodiments, as discussed above, when a power supply unit is present, the power supply unit may not provide sufficient power for all computing components, and the battery may supply at least some of the power for the computing device. FIG. 12-1 is a representation of a temperature and power limit control system method 1021, which may maintain a consistent battery discharge rate, thereby extending the life of the battery. The method 1021 may be performed by a thermal module, e.g., thermal algorithm(s) operating in conjunction with a processor and/or control circuitry of the device. The control system method 1021 includes receiving power supply size information at 1023. The control system method 1021 further includes receiving battery state of charge information at 1025. The control system method 1021 includes adjusting a computing component power limit reach a battery charge discharge equilibrium at 1027.

In this manner, if the power limit of a computing component is greater than a power supply such that the battery may begin to be discharged while plugged in, the computing component power limit may be reduced until the charge rate is at equilibrium with (or above) the discharge rate.

In some embodiments, equilibrium may be such that the battery is simply not charging. In some embodiments, equilibrium may be such that the battery charge rate is approximately the same (e.g., within 5% of) the battery discharge rate. In some embodiments, equilibrium may be a charge rate sufficient to maintain a minimum computing component power limit.

FIG. 12-2 is another representation of the control system method 1021 of FIG. 12-1. In the embodiment shown, the battery state of charge 1086 is received as an input in an operation, such as the lookup table 1017. The output of the look-up table 1017 is then stored in a virtual node 1090. The virtual node 1090 is then accessed by a PID control 1019. The PID control 1019 may then output a computing component power limit to an output channel 1098, which may control the power limit of the computing component. The PID control may use the battery state of charge information from the virtual node 1090 to reduce the power limit of the computing component until the battery state of charge is in equilibrium.

Use Case 4: Battery Charge Discharge Rate

In some embodiments, a battery may have a maximum discharge rate. Discharging the battery above this maximum discharge rate may decrease the performance and/or reliability of the battery. Furthermore, as the battery state of charge decreases, increases in the maximum discharge rate may completely drain the battery and/or cause the battery level to be reduced such that the computing device may go to sleep and/or shut down.

Figures 1, 13:
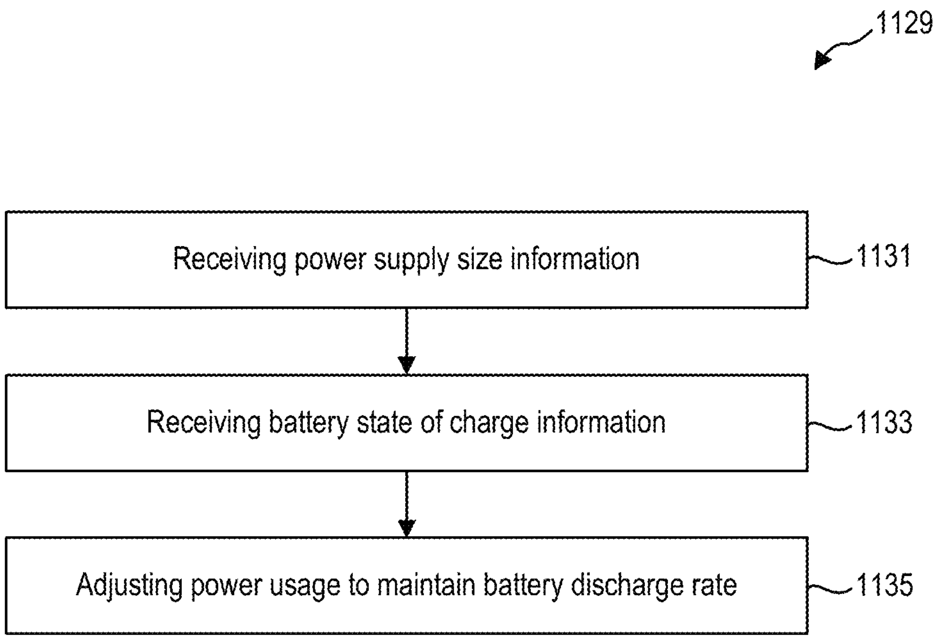
Figures 2, 13:
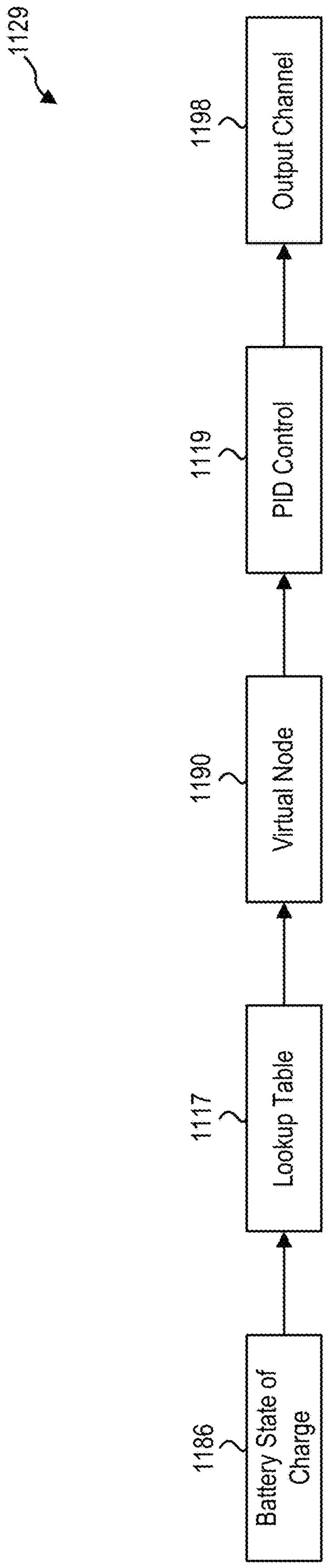

FIG. 13-1 is a representation of a temperature and power limit control system method 1129 to maintain a battery discharge rate, according to at least one embodiment of the present disclosure. The method 1129 may be performed by a thermal module, e.g., thermal algorithm(s) operating in conjunction with a processor and/or control circuitry of the device. The control system method 1129 includes receiving power supply size information at 1131. Battery state of charge information is received at 1133. Using at least the battery state of charge information, the power limit of a computing component is adjusted to maintain a battery discharge rate at 1135. This may increase the battery life of the computing device by not discharging the battery too quickly.

FIG. 13-2 is another representation of the control system method 1129 of FIG. 13-1. In the embodiment shown, the battery state of charge 1186 is received as an input in an operation, such as accessing the lookup table 1117. The output of the look-up table 1117 is then stored in a virtual node 1190. The virtual node 1190 is then accessed by a PID control 1119. The PID control 1119 may then output a computing component power limit to an output channel 1198, which may control the power limit of the computing component. The PID control may use the battery state of charge information from the virtual node 1190 to adjust the power limit of the computing component until the battery rate of charge is at the predetermined discharge rate.

In some embodiments, the predetermined battery state of charge may determine the battery discharge rate. The predetermined state of charge may be less than 20%, less than 15%, less than 10%, less than 5%, less than 2%, less than 1%, and any value therebetween. If the battery state of charge is below the predetermined state of charge, then the computing component power limit is changed such that the battery discharge rate is at or below a predetermined discharge rate. This may help to extend the battery life. In some embodiments, the predetermined discharge rate may be approximately 1 C. In some embodiments, the predetermined discharge rate may be approximately 0.7 C.

FIG. 13-3 is a representation of examples of the operations of the control system method 1129 of FIG. 13-1. For example, Table 13.1 is an example of the lookup table 1117. Thus, if a relative state of charge (RSOC) is between 10% and 100%, the output is one (e.g., health state of charge), if the state of charge is less than 10%, then the output is two (e.g., low state of charge). If the power source size is outside of this range, then the output is assumed to be one (e.g., healthy state of charge). Table 13.2 is an example of the inputs and legend for a PID array setup, the PID array, and the PID parameter definitions.

A user interface may provide a way for the user to modify and/or change the parameters used in the control system method 1129. FIG. 13-4 is a representation of a user interface, where the user may change values to affect the threshold state of charge and the predetermined discharge rate. The user interface may also be used to display virtual node data to the user, allowing the user to identify potential problems and take corrective action.

Use Case 5: Tracking of Telemetry Data

In some embodiments, the results of many different operations are stored in virtual nodes. These virtual nodes may include valuable data about the performance of the computer. For example, the virtual nodes may include the presence of a power supply, the computing component power limit for a set of conditions, PID control inputs, and any other output. This information may be collected as telemetry data and used to adjust the performance of a computing device.

Figure 14:
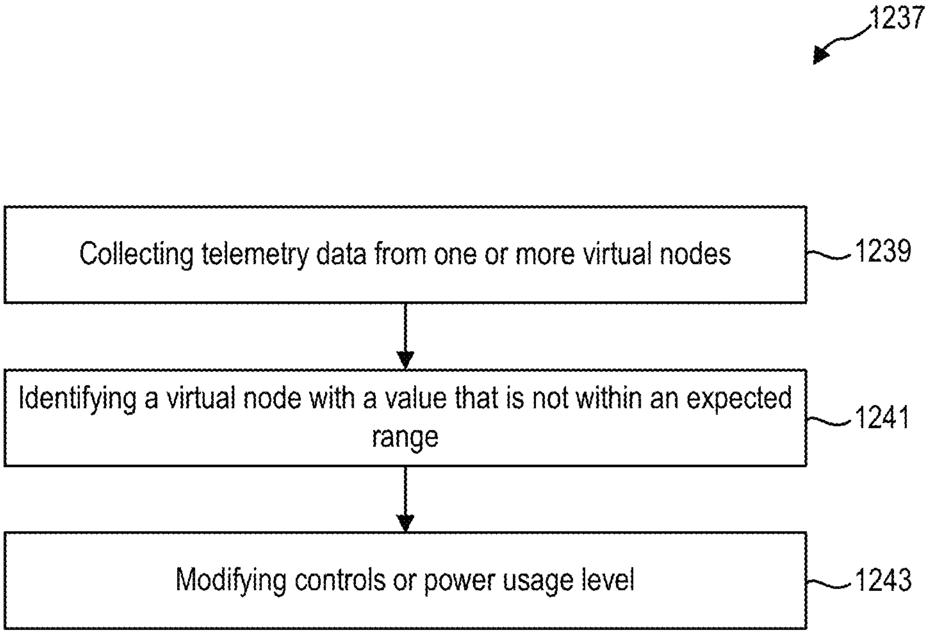
FIG. 14 is a representation of a method for tracking and adjusting performance of a computing device, according to at least one embodiment of the present disclosure.

FIG. 14 is a representation of a method 1237 for tracking and adjusting performance of a computing device. The method 1237 may be performed by a thermal module, e.g., thermal algorithm(s) operating in conjunction with a processor and/or control circuitry of the device. The method 1237 includes collecting telemetry data from one or more virtual nodes at 1239. The telemetry data may be monitored and/or analyzed to determine any unexpected values. An unexpected value may be any value that is not within an expected range. A virtual node that includes an unexpected value, or a value that is not within an expected range, may be identified for a user or developer at 1241.

The identified virtual node may be used to modify one or more controls from a control system, or a power limit level at 1243. For example, the telemetry data may indicate an abnormally large power limit for a computing component, such as a particular processor. This indication may be used to notify users that a larger power supply is recommended for the particular processor.

In this manner, the user may optimize the temperature and/or power limit of the computing device. For example, the user may notice that the battery may have a rate of discharge for a given power situation that is greater than desired. The user may therefore change the battery charge discharge rate, such as the maximum computing component power limit for a given battery state of charge.

Furthermore, in some embodiments, the user may identify one or more malfunctioning components based on the virtual node data. For example, a malfunctioning processor may draw too much power to perform a given operation. The power limit of the processor may be flagged (e.g., highlighted) in the telemetry data shown to the user, which may indicate that the processor is malfunctioning. This may prompt the user to remove or replace the processor. In some examples, a malfunctioning processor may not draw as much power as anticipated. The user may notice that the maximum actual power limit from the processor is lower than expected (e.g., based on the power limit being highlighted in the telemetry data), which may indicate that the processor is malfunctioning. This may cause the user to remove or replace the processor, thereby improving performance of the computing device.

In some embodiments, the telemetry data may be communicated to a remote system. For example, a developer may wish to receive telemetry data to track trends across multiple devices. By receiving this telemetry data, the developer or other user may process and track trends such as poorly sized processors, batteries, and/or other computing components. To ensure user privacy, the data may be anonymized. Moreover, users may be able to opt-in or out of transmitting the telemetry data to the remote device.

In some embodiments, the telemetry data may be used by the developer to provide software and/or firmware updates to the computing system. For example, the developer may use the telemetry data to change how the operations process state data and/or information store in virtual nodes. In some examples, the developer may use the telemetry data to change the computing component power limits for selected criteria. In this manner, the developer may use trends across multiple computing devices to improve the performance of the computing devices.

In some embodiments, the telemetry data may allow the computing system and/or the user to identify computing components that may be replaced. For example, if the telemetry data indicates that a specific processor is consistently underperforming, then the developer and/or the operating system may flag this processor and recommend its replacement. In some embodiments, the user may provide input prior to changing controls in the operating system and/or replacing or upgrading a component. For example, the user may provide input regarding battery charge discharge rates, and the controls in the operating system and/or computing components may be replaced based at least in part on the user input.

Use Case 6: Identifying Misconfiguration of Thermal Management Elements

In some embodiments, one or more of the state data information inputs may produce erroneous results. For example, a power supply size state data may provide a power size value that is outside of an expected range. Because the power supply size will almost always fall within a range (e.g., from 0 W to 120 W), then a value outside of this range is likely erroneous. A subsequent operation performed on this state data may then make an erroneous determination (e.g., determine that the power supply unit is not present). Based on this determination, the computing component power limit may be selected despite the erroneous input.

Figure 15:
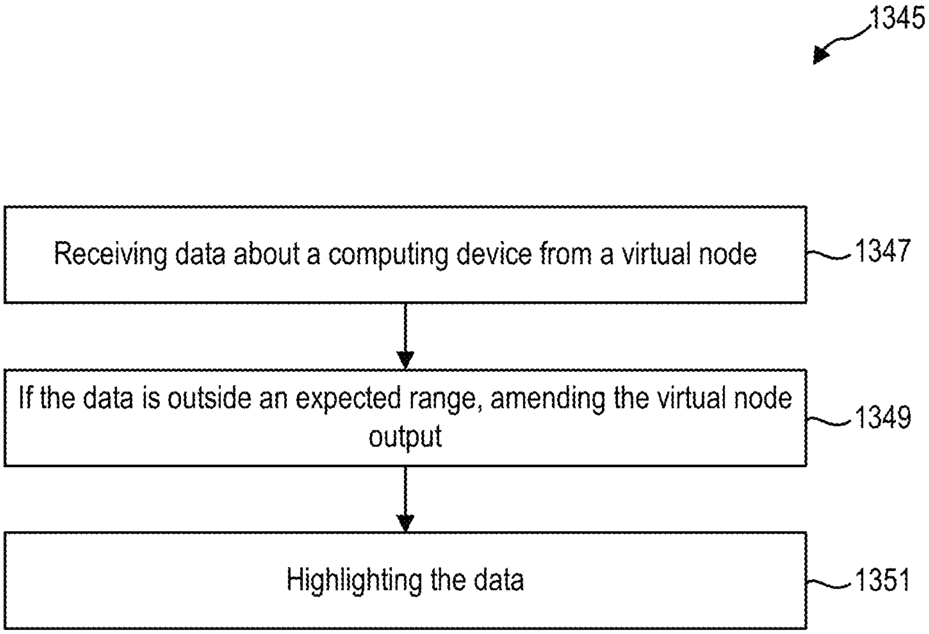
FIG. 15 is a representation of a method for providing information with virtual node data, according to at least one embodiment of the present disclosure.

FIG. 15 is a representation of a method 1345 for providing information with virtual node data, according to at least one embodiment of the present disclosure. The method 1345 may be performed by a thermal module, e.g., thermal algorithm(s) operating in conjunction with a processor and/or control circuitry of the device. Data about a computing device stored on a virtual node is received at 1347. The data may be received at an operation of a control system. If the data is outside of an expected range, the virtual node output may be amended to include an error code at 1349.

For example, an output value stored in a virtual node may include a computing component power limit value that is in the magnitude of thousands of milliWatts (e.g., 15000 mW). If the input value is outside of the expected range, then the last digit or two digits of the output value may be amended to include an error code. For example, the output value of an erroneous input may be 15001 mW. Because 1 mW is less than the practical sensitivity of the power supply/output of the computing device, amending the computing component power limit by 0-10 mW may not affect the implementation of the computing component power limit.

When a user accesses this data stored in the virtual node (e.g., via a user interface such as the interface shown in FIG. 8-4), the user may be able to identify the error in the input state data based on the error code integrated into the data. In this manner, the user may be able to troubleshoot the error and change something to fix the problem. In some embodiments, the data stored in the virtual nodes may be monitored. Data values that have been amended with an error code may be highlighted at 1351. This information may be presented to the user (e.g., an individual user and/or a developer). Based on the error code, the user may then change a parameter of the computing system, such as an operation in a control system and/or a computing component.

Table 15.1 is a sample list of error codes which may be amended onto the end of computing component power limit values. These error codes may then be monitored and highlighted for the user and/or the developer, thereby allowing the identification and/or the fixing of the errors.

TABLE 15.1

| Trouble Codes (last 2 digits of reading) |
|---|
| 01-Feature 2 has an input too low |
| 02-Feature 2 has an input too high |
| 03-Feature 1 PID has default non calculated value |
| 04-Feature 1 PID has reached a max limit |
| 05-Feature 1 PID has reached a min limit |
| 06-Feature 4 control is using a non calculated value |
| 07-Feature 4 math calculated a value higher than max |

TABLE 15.1-continued

| Trouble Codes (last 2 digits of reading) |
|---|
| 08-Feature 4 math calculated a value lower than min |
| 09-Feature 5 control is using a non calculated value |
| 11-Feature 5 PID has a default non calculated value |
| 12-Feature 5 PID has reached a max limit |
| 13-Feature 5 PID has reached a min limit |
| 14-Feature 6 has default non calculated value |
| 15-Feature 6 has reached a max limit |
| 16-Feature 6 has reached a min limit |
| 17-Feature 6 has an invalid input |

The user interface according to the present disclosure includes several locations where a user may find edit thermal and power management system and operations, according to embodiments of the disclosure described herein. For example, the user may identify sensed and/or determined temperatures, such as the touch temperature and the battery temperature. The user may identify and, in some embodiments, modify the touch temperature limit. The user may further identify other operating characteristics, such as the fan RPM, the OS slider position, the device posture, the processor power consumption, the backlight power consumption, and the total system power consumption. This information may provide the user with the ability to track and manage the thermal operation and status of the computing device.

The user may further enter into interfaces that allow the user to identify and modify power management operations. For example, the user may check the battery level (e.g., percent full) and the power source unit status (e.g., plugged in, not plugged in, and power source unit size). The user may identify and/or change the backlight level. The user may further enter into interfaces to manage the system brownout protection (as discussed above in reference to FIG. 10-1 through FIG. 10-5). The user may enter into interfaces to manage battery discharge rate protection (as discussed above in reference to FIG. 13-1 through FIG. 13-4). The user may further enter into interfaces to manage underpowered power source unit protection (as discussed above in reference to FIG. 12-1 and FIG. 12-2). In this manner, the user interfaces may allow the user to manage and monitor the thermal and power systems of the present disclosure.

FIG. 16 is a representation of a user interface, according to at least one embodiment of the present disclosure. The user interface includes several locations where a user may find and/or edit thermal and power management system and operations, according to embodiments of the disclosure described herein. For example, the user may identify sensed and/or determined temperatures, such as the touch temperature, and the battery temperature. The user my identify, and in some embodiments, modify, the touch temperature limit. For example, the user may adjust an expected range of touch temperatures, battery temperatures, etc. to set the limits allowed by the thermal control module and associated methods. The user may further identify other operating characteristics, such as the fan RPM, the OS slider position, the device posture, the processor power consumption, the backlight power consumption, and the total system power consumption. This information may provide the user with the ability to track and manage the thermal operation and status of the computing device.

The user may further enter into interfaces that allow the user to identify and modify power management operations. For example, the user may check the battery level (e.g., percent full) and the power source unit status (e.g., plugged in, not plugged in, and power source unit size). The user may identify and/or change the backlight level. The user may further enter into interfaces to manage the system brownout protection (as discussed above in reference to FIG. 10-1 through FIG. 10-5). The user may enter into interfaces to manage battery discharge rate protection (as discussed above in reference to FIG. 13-1 through FIG. 13-4). The user may further enter into interfaces to manage underpowered power source unit protection (as discussed above in reference to FIG. 7-1 and FIG. 7-2). In this manner, the user interfaces may allow the user to manage and monitor the thermal and power systems of the present disclosure.

INDUSTRIAL APPLICABILITY

The present disclosure relates generally to systems and methods for communicating between components of a computing device to manage power and thermal performance of the computing device. In some embodiments, devices, systems, and methods according to the present disclosure allow a computing device to survey the component devices of the computing device and create a registry and plurality of interfaces to communicate with and control the components. In some embodiments, the registry and plurality of interfaces allows two-way communication between the components to receive inputs from one or more components and provide outputs in response to one or more components.

In some embodiments, a computing device includes a plurality of components from a variety of manufactures or suppliers. In some embodiments, a user replaces or changes one or more components of the computing device. In some embodiments, a thermal module of the computing device is agnostic to the provenance of the components of the computing device. The thermal module can query the plurality of components upon startup or another triggering event to request and receive information from the components and dynamically create a registry of all components in the computing device with which the thermal module can communicate and control.

In some embodiments, a thermal module receives inputs from one or more components regarding temperature, power consumption, heat generation, performance or other data regarding the component. The thermal module or other software module or hardware device in data communication with the thermal module evaluates the inputs and, based on the inputs, the thermal module sends one or more outputs to one or more components. The outputs can set new power levels, thermal controls, or other performance settings.

In some embodiments, the computing device has a plurality of hardware components with which the thermal module communicates. In some embodiments, the computing device is a laptop device. In some embodiments, the computing device is a tablet computing device, a hybrid computing device, a desktop computing device, a server computing device, a wearable computing device (e.g., a smartwatch, a head-mounted device, or other wearable device), a smart appliance (e.g., a smart television, a digital personal assistant or hub, an audio system, a home entertainment system, a home automation system, an in-car infotainment system), or other computer device.

In some embodiments, the computing device has a first portion and second portion that are movably connected to one another. The computing device includes various components located in or on the portions of the computing device that are in data communication through one or more buses and interfaces. In some embodiments, the thermal module establishes and uses two-way communication with one or more of the components. Examples of components include a processor(s), input device(s), display(s), hardware storage device(s), thermal management device(s), graphics processor(s), communication device(s), and other components.

In some embodiments, the processor(s) is a central processing unit (CPU) that performs general computing tasks for the computing device. In some embodiments, the processor(s) is or is part of a system on chip (SoC) that is dedicated to controlling or communicating with one or more subsystems of the computing device. In some embodiments, the processor is in data communication with the hardware storage device to execute instructions stored thereon that cause the processor to perform any of the methods described herein.

In some embodiments, the input device(s) is a mouse, a stylus, a trackpad, a touch-sensitive device, a touch-sensitive display, a keyboard, or other input human-interface device. In some embodiments, the input device(s) is part of the computing device, such as a trackpad or a keyboard. In some embodiments, the input device(s) is a discrete device in data communication with the computing device, such as a stylus in wireless data communication with the computing device.

In some embodiments, the display(s) is a liquid crystal display (LCD), a light emitting diode (LED) display, a thin film transistor (TFT) display, a cathode ray tube (CRT) display, or other display. In some embodiments, the display is integrated into the computing device. In some embodiments, the display is a discrete monitor or other display that is in wired or wireless data communication with the computing device.

In some embodiments, the hardware storage device(s) is a non-transient storage device including any of RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

In some embodiments, the thermal management device(s) includes passive thermal management, such as vapor chambers, heat pipes, heat spreaders, fins, meshes, or other passive heat dissipation or transport devices; or active thermal management, such as a fan, liquid cooling, solid-state (e.g., Peltier) cooling, or other active heat dissipation or transport devices. In some embodiments, the thermal management device(s) includes temperature measurement devices, such as thermocouples or thermistors, that measure and report temperature information from one or more locations of the computing device. In some embodiments, other components of the computing device include temperature measurement devices as well.

In some embodiments, the graphics processor(s) is discrete from the CPU or other processor and is in data communication with the CPU or other processor. In some embodiments, the graphics processor(s) is integrated with (e.g., on a shared die with) another processor.

In some embodiments, the communication device(s) is in data communication with the processor(s) to allow communication with one or more external computing devices, networks, or components. In some embodiments, the communication device is a network communications device, such as including a wired (e.g., Ethernet) port or wireless (e.g., WiFi) antenna. In some embodiments, the communication device is a short-range wireless communication, such as a BLUETOOTH connection or a WiFi-Direct connection, that allows data communication between the computing device and electronic devices in proximity to the computing device. In some embodiments, the communication device is a near-field communications (NFC) device that is used for data communication, wireless charging of other components and/or accessory devices, or both.

In some embodiments, to provide silicon-agnostic system controls, a thermal module communicates with a unified extensible firmware interface (UEFI), a registry, or a file to read a system configuration or other list of available components of the computing device. In some embodiments, the system configuration includes information regarding processing procedures for input interface data and mapping of input interface data to output interfaces. In some embodiments, one or more potential components are detected by monitoring component and/or device connections through an operating system of the computing device.

In some embodiments, a thermal module communicates with a configuration and monitoring application to receive information from the UEFI and Registry. The UEFI and Registry provide information to the thermal module regarding the plurality of known potential components in the computing device. In some embodiments, the thermal module then sends a request to each of the potential components, and upon receiving a valid response back from the potential component, assigns the component to an interface. In some embodiments, the thermal module receives an invalid response or no response from the component and does not assign that component to an interface. An invalid response or no response may indicate that the component is not compatible with the thermal module or with other components of the computing device. In some embodiments, an incompatible device is unable to provide inputs to or receive outputs from the thermal module.

In some embodiments, the response from the component includes a globally unique identifier (GUID) that allows the thermal module to uniquely identify that component and assign the component to an interface. In some embodiments, the response includes an instance identification (ID) that uniquely identifies the instance. The GUID and instance ID are used to create a unique interface assignment for the current system configuration of the computing device. In some embodiments, the thermal module creates a directory of available components of the computing device. The directory can be used to reestablish the interfaces with components in future sessions.

In some embodiments, the thermal module communicates with a plurality of interfaces to which the plurality of potential components is assigned. In some embodiments, each potential component is assigned to a distinct interface. In some embodiments, a group of components are assigned to a single interface to receive inputs from the group collectively and to send outputs to the group collectively. In some embodiments, a component is assigned to more than one interface, such as when that component is affiliated with multiple groups of components. In some embodiments, a component is assigned to an interface based upon the GUID and the instance ID and the thermal module assigns a tag to the interface with which the thermal module communicates In some embodiments, the response from the component includes information relating to one or more capabilities of the component. In some embodiments, a capability includes a reporting capability. In some embodiments, a capability includes a control capability. For example, a CPU component may have a power consumption reporting capability, a temperature reporting capability, and a clock speed control capability. The thermal module can receive inputs from the CPU component related to power consumption and temperature of the CPU and send outputs to the CPU component to control the clock speed.

In some embodiments, the thermal module contains configurable control logic that enables any-to-any control mechanisms based on the capabilities reported by the components in the responses. The thermal module can, therefore, receive one or more inputs from one or more components, evaluate the inputs and determine whether mitigation or intervention is needed, and send an output to one or more components to respond to the inputs.

In some embodiments, the one or more output components (e.g., the one or more components receiving an output from the thermal module) and the one or more input components (e.g., the one or more components providing an input to the thermal module) are different. For example, a plurality of processors (e.g., the CPU and GPU), the motherboard, and the battery may each report a temperature to the thermal module, and the thermal module can send an output to the fan to increase speed.

In some embodiments, the one or more output components and the one or more input components are the same. For example, the thermal module receives temperature inputs from the CPU and GPU, and the thermal module sends clock speed outputs to the CPU and GPU.

In some embodiments, at least one of the one or more output components and the one or more input components is the same. For example, the thermal module receives a power consumption input from the CPU and GPU and charge level and charge rate inputs from the battery, and the thermal module sends a power level or brightness output to the display and a clock speed output to the GPU.

In some embodiments, the thermal module requests information from the one or more components through the interfaces and pulls inputs from the components. In some embodiments, the thermal module pulls input values at a first rate when the input value is above a threshold value and at a second rate when the input value is below a threshold value. For example, when the CPU temperature is in a safe range of values, such as below 120° C., the thermal module polls the CPU component at a first rate, and when the reported CPU temperature exceeds the threshold value, such as exceeding 120° C., the thermal module polls the CPU component at a second rate that is greater than the first to monitor the CPU temperature more frequently.

In some embodiments, the thermal module sends configuration instructions (e.g., a configuration file) to a component to set reporting parameters from the component to the thermal module. The configuration instructions may instruct the component to report one or more inputs (e.g. push one or more inputs) to the thermal module in an event-based mode. For example, the component may be set to send inputs to the thermal module upon a value change of the component.

In some embodiments, the configuration instructions instruct the component to report one or more inputs when a reported value (e.g., temperature, power consumption, state of charge) crosses a threshold value. In some embodiments, the configuration instructions instructs the component to report one or more inputs when a reported value (e.g., temperature, power consumption, state of charge) crosses a threshold value and the thermal module continues to poll the component until the reported value is within the threshold value.

In some embodiments, the thermal module can utilize existing driver module framework (DMF) information or modules. The thermal module can communicate with the components by using existing DMF modules of the component drivers. For example, the component drivers include existing DMF modules that can be used without modification or with modification to provide communication with the thermal module. By reusing the existing DMF modules, embodiments of a thermal module according to the present disclosure can communicate with components without preloading of modules.

In some embodiments, a modified DMF communication module is used by the thermal module to communicate with the component drivers. In some embodiments, the modified DMF communication module allows communication with a plurality of components at the same time. The component drivers similarly use a modified DMF module to manage communications to and from the thermal module. In some embodiments, the component drivers utilize unmodified DMF modules.

In some embodiments, the configuration file or other file sent by the thermal module can load custom logic on the component drivers that provides information and/or inputs to the thermal module. In some embodiments, the configuration file or other file sent by the thermal module can load custom logic on the component drivers that provides information and/or inputs to the thermal module.

In some embodiments, a thermal module accesses a UEFI and a Registry. The UEFI includes channel configurations having GUIDs and instance IDs. The UEFI also contains algorithm GUIDs and Input and Output GUIDs to allow the thermal module to uniquely identify components and communications with the components of the computing device.

In some embodiments, after reading the UEFI and the Registry, the thermal module parses the configuration information and checks the validity of the component information and communication. The thermal module can then configure the plurality of interfaces to communicate with the components of the computing device. In some embodiments, the thermal module establishes the interface logic that provides input/output control and sets the reporting parameters with the components.

In some embodiments, the thermal module further establishes the input channels to receive input information regarding component statuses and operating conditions. In some embodiments, the input channels perform data validity checks and data caches for the received inputs. The input channels, with the interface logic, provide information to the algorithm pipelines, which evaluate the input information and configuration to determine the outputs and the components to receive the outputs. In some embodiments, the output channels determine whether or not the output needs to be sent to a component.

In some embodiments, a method of thermal and power control in a computing device includes initializing a thermal module of a computing device, as described herein. In some embodiments, the computing device is a laptop computing device, a tablet computing device, a hybrid computing device, a desktop computing device, a server computing device, a wearable computing device (e.g., a smartwatch, a head-mounted device, or other wearable device), a smart appliance (e.g., a smart television, a digital personal assistant or hub, an audio system, a home entertainment system, a home automation system, an in-car infotainment system), or other computer device. In some embodiments, the thermal module is in two-way data communication with a plurality of components of the computing device.

The method further includes receiving an input at the thermal module from a first component assigned to an interface of the thermal module. The thermal module applies an algorithm to the input(s) and determines whether an output needs to be sent to a component of the computing device. If the thermal module determines that the output is to be sent, in some embodiments, the method further includes sending an output to a second component from the thermal module. In some embodiments, the first component and the second component are the same component. In some embodiments, the first component and second component are different components.

In some embodiments, the method includes initializing a thermal module of a computing device, receiving an input at the thermal module from a first component assigned to an interface of the thermal module, and sending an output to a second component from the thermal module similar to as described above.

In some embodiments, initializing a thermal module includes detecting a presence of a plurality of potential components of the computing device and querying each of the plurality of potential components to determine capabilities of each component. In some embodiments, detecting the presence of the plurality of potential components includes reading a UEFI and/or Registry. In some embodiments, detecting the presence of the plurality of potential components includes monitoring component connections or changes in component connections through an operating system of the computing device.

In some embodiments, in response to querying each of the plurality of potential components, the method includes receiving identification information for the component for at least a subset of the components and configuring, based on the received information, one or more interfaces of the plurality of predefined interfaces of the thermal module to establish communication with the subset of components. After initializing the thermal module, the thermal module may receive inputs and send outputs, in accordance with the descriptions herein.

In some embodiments, a thermal module allows more efficient or faster changes to system settings. In at least one embodiment, a user changes a setting on the operating system to set the computing device to a performance mode. The performance mode allows higher power consumption and operating temperatures for the processors and memory and allows for a greater power consumption rate from the power supply. In some embodiments, the performance mode is configured to operate a GPU at the highest clock speed and power consumption available while remaining below a target temperature.

A thermal module communicates with the CPU, GPU, power supply, thermal management devices, and memory to receive inputs regarding temperature and power levels. In some embodiments, input channels validate the inputs and sends the validated information to the algorithm pipeline. The algorithm pipeline then evaluates the inputs and determines settings for the components to increase performance while staying below the temperature thresholds set in the performance mode.

In a conventional system, a target value is set by selecting one closed-loop controller from a plurality of closed-loop controllers at different setting values. For example, a first closed-loop controller is set to maintain the GPU power level at 30 Watts (W) and a second closed-loop controller is set to maintain the GPU power level at 50 W. A closed-loop controller utilizes closed feedback loops to approach the target value. When switching between the first closed-loop controller and the second closed loop controller, a closed feedback loop responds rapidly to a large delta between the target value and measured value, resulting in the system overshooting the target value. In examples such as temperature targets, overshooting the target value risks damage to the components or system. Dampening the response can limit the risk of damage but produces a slower response.

In some embodiments according to the present disclosure, a thermal module includes a hybrid control system with an open-loop control algorithm and a closed-loop control algorithm used at different times. In some embodiments, the thermal module uses an open-loop control algorithm to ramp the output value to within a preset range of the target value before changing to a closed-loop control algorithm to maintain the output value within the preset range and/or at the target value over a period of time.

The open-loop module can ramp the output value at a controlled rate, such as linearly or exponentially. In some situations, a linear ramp to the target value provides a known response rate and the rate can be selected by the thermal module. In some situations, the linear ramp also reduces overshoot of the target value.

In some embodiments, the closed-loop module calculates an error value (e.g., a difference) between the target value and the measured output value. The closed-loop module then applies a correction to minimize the difference and make the output value closer to the target value.

In some embodiments, the closed-loop module is a proportional module. For example, the correction is proportional to the error value, producing a larger response at larger error values. A proportional response can overshoot the target value if the initial error value is large and/or the measurement frequency is low.

In some embodiments, the closed-loop module is an integral module. For example, the correction action increases in relation to the magnitude of the error value and the duration of time for which the error value has persisted. An integral module, therefore, has a slower initial response that increases over time. Again, an integral response can overshoot the target value if the initial error value is large and/or the measurement frequency is low. Moreover, an integral response may overshoot if it has been monitoring conditions, but not used to drive the output (e.g., a different response was driving the output). In this situation, the integral response operates with a long duration of time condition that may cause it to be overly aggressive in correcting the error value.

In some embodiments, the closed-loop module is a derivative module. For example, the correction action increases in relation to the rate of change of the magnitude of the error value. A derivative module, therefore, has a propensity to oscillate without dampening.

In some embodiments, the closed-loop module is a combination of proportional (P), integral (I), and derivative (D) closed feedback loops. In some embodiments, the closed-loop module is a PI module. In some embodiments, the closed-loop module is a PD module. In some embodiments, the closed-loop module is an ID module. In some embodiments, the closed-loop module is a PID module.

In some embodiments, a thermal module according to the present disclosure uses a single closed-loop controller for a plurality of target values. In relation to the example described above, in some embodiments, a thermal module uses a closed-loop controller to maintain a GPU power level at or near 30 W. Simply switching to a second closed-loop controller with a target value of 50 W produces a large error value and potential damage to the system.

In some embodiments, a thermal module according to the present disclosure switches from the closed-loop controller with a target value of 30 W to an open-loop module to ramp the GPU power level toward 50 W. When the measured value (or output value) of the GPU power is within a threshold value of the target value (e.g., within 2 W of the 50 W target), the thermal module switches back to the closed-loop module with a new target value of 50 W. In some embodiments, the target value of the PID can be reinitialize while the thermal module is using the open-loop module. In some embodiments, using a single PID controller (or other closed-loop controller) can reduce system resources and improve efficiency. For example, each PID controller performs multiple floating-point calculations during its operation, and these calculations use significant processor resources. Thus, having a single PID controller that is resettable saves system resources as compared to having distinct PID controllers for each setpoint. Moreover, reinitializing the PID controller inhibits the integral component from being too aggressive due to it accounting for a time period when the PID controller was not controlling the output value (e.g., while the open-loop module was in control).

In a particular embodiment, the computing device is powering up or waking up and the components are at ambient temperature (e.g., 25° C.). Upon initial warm-up, an open-loop module sets the GPU power limit at the maximum or allows the GPU power to operate unlimited. The open-loop module receives inputs from a temperature sensor measuring the housing temperature until the housing temperature reaches a first threshold of the target temperature. In some embodiments, the open-loop module subsequently reduces the GPU power level to a first preset step-down level at which the GPU power is sufficient to continue increasing the measured housing temperature.

When the housing temperature reaches the target value or a second threshold, the closed-loop module initializes (or reinitializes) and begins to control the GPU power level. In some embodiments, the closed-loop module initializes with the same starting GPU power level as the GPU power when the closed-loop module takes control. The closed-loop module will remain engaged when the measured temperature fails below the temperature target. Once the temperature falls below a hysteresis value (e.g., beyond a range where the closed-loop module does not reliably maintain the temperature without undesired behavior), in some embodiments, the GPU power level may be set to maximum, similar to warm-up, or the open-loop module takes control of the GPU power level.

In some embodiments, a dead band is used with the closed-loop module. In some embodiments, the dead band is approximately 1%-2% of the temperature target (e.g., 0.5° C.-1° C.). While the temperature is within the dead band, the closed-loop module maintains a constant output such that closed-loop module does not send instructions to the GPU or other components to make constant, small changes when the temperature is within the dead band, near the target. This reduces the control instructions to the GPU or other controlled component.

In some embodiments, a method of using a hybrid control system in the thermal and power management of a computing device includes obtaining a first value of a first temperature property (e.g., housing temperature) of the computing device and obtaining a first target value of the temperature property. In some embodiments, the first value is obtained by receiving the first value from a component and/or sensor of the computing device. In some embodiments, the first value is generated by the thermal module or control module based on a plurality of inputs. In some embodiments, the first target value is based on one or more inputs from components, sensors, or modules. In some embodiments, the first target value is input by a user. The method further includes setting a first target value of a GPU power level based on an initial error value between the first value of the temperature property and the first target value of the temperature property.

In some embodiments, the method includes ramping toward the first target value of the GPU power level by utilizing an open-loop module to control the GPU power level and, while utilizing the open-loop module to control the GPU power level, obtaining a second value for the temperature property. The method further includes determining that a second error value between the second value and the first target value of the temperature property is less than a preset threshold, and, in accordance with the determination, utilizing a closed-loop module to control the GPU power level and ceasing to use the open-loop module to control the GPU power level.

In some embodiments, the threshold at which the method changes from an open-loop control to a closed-loop control is less than 1% of the target value. In some embodiments, the threshold is less than 2% of the target value. In some embodiments, the threshold is less than 3% of the target value. In some embodiments, the threshold is less than 5% of the target value. In some embodiments, the threshold is less than 10% of the target value. In some embodiments, the threshold is less than 20% of the target value.

In some embodiments, the threshold at which the method changes from an open-loop control to a closed-loop control is a percentage of the initial error value (e.g., the difference between the target value and a value of the property at the start of the open-loop control ramp). In some embodiments, the threshold is less than 1% of the initial error value. In some embodiments, the threshold is less than 2% of the initial error value. In some embodiments, the threshold is less than 3% of the initial error value. In some embodiments, the threshold is less than 5% of the initial error value. In some embodiments, the threshold is less than 10% of the initial error value. In some embodiments, the threshold is less than 20% of the initial error value. In some embodiments, the threshold is less than 30% of the initial error value. In some embodiments, the threshold is less than 50% of the initial error value.

In some embodiments, another method of hybrid power and thermal control in a computing device includes receiving a first input from a first component with a thermal module according to the present disclosure. In some embodiments, the method includes obtaining, using the thermal module, one or more first target values for one or more components of the computing system based on the first input. The method further includes, utilizing an open-loop module to determine one or more first operating instructions to be sent to the one or more components based on the one or more target values and sending the one or more first operating instructions to the one or more components. For example, the property may be a power consumption rate, and the thermal module may increase CPU and/or GPU power levels with an open-loop controller until the power consumption rate approaches the target value.

In some embodiments, the method further includes receiving a second input indicating that an output value of the component is within a preset threshold of one of the one or more first target values. When the property is within the threshold, the method includes initializing a single closed-loop controller with the one of the one or more target values and utilizing the closed-loop controller determine and send second operating instructions to the one or more components so as to maintain the property within the preset threshold. In some embodiments, the thermal module sets a second target value for the property. For example, if a performance setting of the operation system or other portion of the computing device limits the power consumption rate, the thermal module may set a second target value that is lower than the first target value. If the second target value is outside the threshold value from the first target value, the thermal module uses an open-loop module to adjust one or more component settings until the property is within the threshold value. Once the property is within the threshold value, the thermal module reinitializes the closed-loop module to maintain the output value of the component at the second target value.

A method for controlling temperature and/or power limit of a computing device, according to at least one embodiment of the present disclosure may be performed by a thermal module, e.g., thermal algorithm(s) operating in conjunction with a processor and/or control circuitry of the device. The method includes obtaining state data about the computing device. The state data may include: device posture; device lid state; operating system slider location; mixed reality or kiosk activity activation; measured temperatures; virtual (e.g., computed or determined) temperatures; battery state of charge; power source unit presence; power source unit size; display backlight power; battery charge rate; battery discharge rate; battery fuel gauge; battery capacity; and combinations thereof. The state data may be obtained from one or more components of the computing device. The state data may be obtained from memory of the computing device. The state data may also include information about user preferences, user settings, and/or past behavior and usage patterns of the user. For example, the state data may include a user preference for device skin temperature that may be lower for users that consistently use the device in contact with their skin and higher for users that user the device on a desk and desire greater performance. As another example, the state data may include information about how often the user tends to keep the device unplugged. This information may be used to control battery discharge rates so as to help ensure the user has insufficient charge levels during anticipated unplugged times.

The method includes applying a first operation to the state data. The first operation may include a mathematical operation, a memory operation, and/or other computer operation (s). For example, the first operation may include accessing a lookup table. The input for the lookup table may be the collected state data. The lookup table may then reference an output value based on the input. For example, the state data may include power supply unit size. The power supply unit size may be inputted into the lookup table, and the output of the lookup table may include an indication of whether the power supply unit is present.

The results from the first operation are stored in a virtual node. The virtual node is a location to store the results of the first operation to be collected and used at a later time. The virtual node corresponds to a location in memory of the device, such as within a hard drive, random-access memory (RAM), latch, or flip-flop of the device. In this manner, the results of the first operation may be used in many different subsequent operations and may be applied to many different types of computing components, regardless of the manufacturer of the computing component. Thus, the control system, using the state data collected and operated on by the first operation, may store the results of the first operation in a virtual node and may use that data in subsequent operations.

A second operation may be performed on the results of the first operation stored in the virtual node. The second operation may be any operation, such as initiation of a PID controller, a multiplexing operation (using input from multiple virtual nodes), a minimum select function, or any other operation. The results of the second operation may be stored in another virtual node and/or provided to an output channel. For example, the second operation may determine a computing component power setpoint, and the output channel may use the computing component power setpoint to limit the power limit of a computing component. Thus, the method may use received state data to control the power limit of a computing component. This may help to regulate the temperature and/or power limit of a computing device. This may improve the performance of the computing device by increasing the battery life and/or improving the performance of the processors.

In some embodiments, a method for controlling temperature and/or power limit of a computing device is performed by a thermal module, e.g., thermal algorithm(s) operating in conjunction with a processor and/or control circuitry of the device. The method includes obtaining inputs that are stored in a virtual node. The inputs may be any of the results of an operation discussed above herein. For example, the inputs may include a maximum computing component power limit value. In other examples, the inputs are the determination of the presence of a power control unit.

In some embodiments, the received inputs then have an operation performed on them. The operation may include any operation. In some embodiments, the operation is initiation of a PID control loop, used to control the battery discharge. In some embodiments, the inputs are a virtual temperature value, and the operation may be accessing a lookup table to produce an output instruction for a solid-state drive. The results of the operation (e.g., the output instructions) are then provided to an output channel. The output channel directs the results to the solid-state drive or to a control system, such as a system used to throttle a solid-state drive or control the power limit of the solid-state drive.

In some embodiments, a method for controlling temperature and/or power limit of a computing device is performed by a thermal module, e.g., thermal algorithm(s) operating in conjunction with a processor and/or control circuitry of the device. The method includes obtaining a plurality of inputs stored in a plurality of virtual nodes. The virtual node inputs may include the results of previously executed operations. An operation may be performed on the plurality of inputs. The operation may be any operation that utilizes a plurality of inputs. For example, the operation may be a multiplexer, which exports a single value based on the entirety of the values. In some examples, the operation may be a minimum-select operation. A minimum-select operation selects the minimum value of a set of values. In this case, if a plurality of computing component power limit values were input into the minimum-select function, the function would output the lowest computing component power limit.

The results of the operation are provided to an output channel. The output channel may use the results to control a component of a computing device. For example, the output channel may reduce the power limit of a processor based on a component power limit output. In this manner, the method may provide an arbitration between many different inputs and elements of a computing device. This arbitration may be easily changed and adjusted to match different inputs. Virtual nodes may be added or removed from the operation, without changing the function or parameters of the operation. In this manner, the method maybe agnostic as to from where the input comes (e.g., each input comes from a virtual node, and the specific input data source that feeds the virtual node does not have to be considered in the operation).

Conventionally, temperature and power limit control systems are specially programmed into individual processors, or the processors of individual manufacturers. Programming these control systems is time consuming and expensive. Furthermore, the programmer is limited to the structure provided by the manufacturer to program the control system. The method outlines a control system process which may be applied to any processor, regardless of the manufacturer or any pre-programmed instructions. This allows the user and/or the developer to customize and manage the temperature and power limit control systems to suit multiple processors and other computing components. This may save time and/or money, increase uniformity across devices, and improve reliability.

Below are representations of use cases of the temperature and power limit control systems, according to embodiments of the present disclosure.

Use Case 1: Brownout Control

In some embodiments, a computing device may be able to use more power than a power supply cable can provide. If this is the case, the computing device may draw power from the battery to receive the rest of the power. If the battery is drained but the computing device remains plugged in with an insufficient power supply, then the computing device cannot adequately perform necessary functions. This may be considered a brownout condition.

The control system includes state data inputs, including inputs for a power supply size and a battery state of charge. The power supply size input may be a representation of the capacity of a power cord connected to the computing device. The battery state of charge input is an indication of the remaining charge in a battery. The battery state of charge may include the amount of mWh left in the battery, or may be a relative state of charge, which is a percentage of the power left in the battery.

A first operation is performed on the power supply size input. For example, the first operation may be accessing a lookup table. The lookup table may indicate whether the power supply is present or may categorize the power supply size as one of several power supply size categories. The results of the first operation are stored in a first virtual node.

A second operation and a third operation are performed on the battery state of charge input. The second operation and the third operation may be implementing linear equations. The difference between the second operation and the third operation may be the assumption of whether a power supply is present or not. For example, the second operation may be an equation that determines a computing component power limit necessary to prevent a brownout based on the battery state of charge assuming a power supply is present. The third operation 894 may be an equation that determines a computing component power limit necessary to prevent a brownout based on the battery state of charge assuming a power supply is not present. The results of the second operation are stored in a second virtual node and the results of the third operation are stored in a third virtual node.

A multiplexer may perform an operation on the results stored in the first virtual node, the second virtual node, and the third virtual node. Based on these inputs, the multiplexer may output a computing component power limit to prevent a brownout condition. For example, if the power supply unit is not present, then the multiplexer would output the computing component power limit from the third virtual node. This result is then provided to an output channel, which may limit the power limit of a computing component to the specified value, thereby preventing a brownout on the computing device.

In some embodiments, if a power source size is zero, the output is zero, if the power source size is between 1 and 150000 mW, then a power source is detected, and the output is 1. If the power source size is outside of this range, then the output is assumed to be zero (e.g., not present).

A user interface may provide a way for the user to modify and/or change the parameters used in the control system. In some embodiments, the user may change values to affect the slope of the linear relationship between the state of charge and the power limit. In this way the user may adjust how quickly the battery is drained. The user interface may also be used to display virtual node data to the user, allowing the user to identify potential problems and take corrective action.

In some embodiments, a first battery state of charge and a second battery state of charge are received as state data inputs. The first battery state of charge and the second battery state of charge are averaged. In some embodiments, the average is a geometrical average. In some embodiments, the average is a weighted average based on battery capacity. The output of the average may then be used in the second operation and the third operation to determine a computing component power limit. This may allow multiple batteries to be taken into consideration when preventing brownouts.

In some embodiments, the computing component has a maximum power limit. This is the maximum power limit for the computing component. The computing component may have a minimum power limit. This is the minimum computing component power limit, below which performance of the computing component is deemed unacceptable. A first curve represents the second operation, e.g., the computing component power limit assuming a power source is present. A second curve represents the third operation, e.g., the computing component power limit assuming a power source is not present.

Above a battery state of charge threshold, the computing component operates at the maximum power limit. The battery state of charge threshold may be different for the first curve and the second curve. For example, if the power source unit is present, then a first battery state of charge threshold may be lower than a second battery state of charge threshold assuming the power source unit is not present. This is because, if a power source unit is present, the battery may not be drained as quickly.

Below a battery state of charge limit, the computing component operates at the minimum power limit. The battery state of charge limit may be different for the first curve and the second curve. For example, if the power source unit is present, then a first battery state of charge limit may be lower than a second battery state of charge limit assuming the power source unit is not present. This is because, if a power source unit is present, the battery may not be drained as quickly, and can reach a lower state of charge before reducing the power limit. By following the curves and, the first operation and the second operation may help provide a computing component power limit to prevent a brownout.

Use Case 2: Posture Determined Thermal Runaway Protection

In some embodiments, a computing device may be changeable between different postures, configurations, modes, or other physical positions. For example, a computing device may include a laptop mode, an airplane mode, a tablet mode, a closed mode, and other modes. Different postures may have different thermal properties. For example, tablet mode, where a keyboard is rotated until it is contacting the rear surface of a display, may close vents and/or reduce the heat dissipation efficiency of the computing device.

In some embodiments, if the heat dissipation of the computing device is reduced, then the temperature of the computing device may increase. In some embodiments, the temperature of the computing device may be increased such that the thermal controls in the computing device may be unable to lower the temperature of the computing device. This may cause the temperature to further increase, which may damage or otherwise impair performance of the computing device. This may be called thermal runaway.

In some embodiments, an existing PID loop is controlling computing component power limit. The PID loop may have a power limit threshold, which may be the maximum power limit for a computing component. Posture information is received as a state data input. The posture information is inputted into an operation, such as the lookup table.

The lookup table may determine a computing component power limit based on the received posture information. These results may be stored in a virtual node. The results stored in the virtual node may be accessed by the PID control loop. If the computing component power limit has changed, the PID control loop may output the computing component power limit to an output channel, which may change the maximum power limit for the computing component. In this manner, as the user changes the posture of the computing device, such as from the laptop mode to the closed mode, the PID control loop may change the power limit of the computing component. This may help to prevent a thermal runaway.

Use Case 3: Adaptively Manage Underpowered Computing Components

In some embodiments, as discussed above, when a power supply unit is present, the power supply unit may not provide sufficient power for all computing components, and the battery may supply at least some of the power for the computing device. The method may be performed by a thermal module, e.g., thermal algorithm(s) operating in conjunction with a processor and/or control circuitry of the device. The control system method includes receiving power supply size information. The control system method further includes receiving battery state of charge information. The control system method includes adjusting a computing component power limit reach a battery charge discharge equilibrium.

In this manner, if the power limit of a computing component is greater than a power supply such that the battery may begin to be discharged while plugged in, the computing component power limit may be reduced until the charge rate is at equilibrium with (or above) the discharge rate.

In some embodiments, equilibrium may be such that the battery is simply not charging. In some embodiments, equilibrium may be such that the battery charge rate is approximately the same (e.g., within 5% of) the battery discharge rate. In some embodiments, equilibrium may be a charge rate sufficient to maintain a minimum computing component power limit.

In some embodiments, the battery state of charge is received as an input in an operation, such as the lookup table. The output of the look-up table is then stored in a virtual node. The virtual node is then accessed by a PID control. The PID control may then output a computing component power limit to an output channel, which may control the power limit of the computing component. The PID control may use the battery state of charge information from the virtual node to reduce the power limit of the computing component until the battery state of charge is in equilibrium.

Use Case 4: Battery Charge Discharge Rate

In some embodiments, a battery may have a maximum discharge rate. Discharging the battery above this maximum discharge rate may decrease the performance and/or reliability of the battery. Furthermore, as the battery state of charge decreases, increases in the maximum discharge rate may completely drain the battery and/or cause the battery level to be reduced such that the computing device may go to sleep and/or shut down.

In some embodiments, a temperature and power limit control system method to maintain a battery discharge rate is performed by a thermal module, e.g., thermal algorithm(s) operating in conjunction with a processor and/or control circuitry of the device. The control system method includes receiving power supply size information. Battery state of charge information is received. Using at least the battery state of charge information, the power limit of a computing component is adjusted to maintain a battery discharge rate. This may increase the battery life of the computing device by not discharging the battery too quickly.

In some embodiments, the battery state of charge is received as an input in an operation, such as accessing the lookup table. The output of the look-up table is then stored in a virtual node. The virtual node is then accessed by a PID control. The PID control may then output a computing component power limit to an output channel, which may control the power limit of the computing component. The PID control may use the battery state of charge information from the virtual node 1190 to adjust the power limit of the computing component until the battery rate of charge is at the predetermined discharge rate.

In some embodiments, the predetermined battery state of charge may determine the battery discharge rate. The predetermined state of charge may be less than 20%, less than 15%, less than 10%, less than 5%, less than 2%, less than 1%, and any value therebetween. If the battery state of charge is below the predetermined state of charge, then the computing component power limit is changed such that the battery discharge rate is at or below a predetermined discharge rate. This may help to extend the battery life. In some embodiments, the predetermined discharge rate may be approximately 1 C. In some embodiments, the predetermined discharge rate may be approximately 0.7 C.

Use Case 5: Tracking of Telemetry Data

In some embodiments, the results of many different operations are stored in virtual nodes. These virtual nodes may include valuable data about the performance of the computer. For example, the virtual nodes may include the presence of a power supply, the computing component power limit for a set of conditions, PID control inputs, and any other output. This information may be collected as telemetry data and used to adjust the performance of a computing device.

In some embodiments, a method for tracking and adjusting performance of a computing device is performed by a thermal module, e.g., thermal algorithm(s) operating in conjunction with a processor and/or control circuitry of the device. The method includes collecting telemetry data from one or more virtual nodes. The telemetry data may be monitored and/or analyzed to determine any unexpected values. An unexpected value may be any value that is not within an expected range. A virtual node that includes an unexpected value, or a value that is not within an expected range, may be identified for a user or developer.

The identified virtual node may be used to modify one or more controls from a control system, or a power limit level. For example, the telemetry data may indicate an abnormally large power limit for a computing component, such as a particular processor. This indication may be used to notify users that a larger power supply is recommended for the particular processor.

In this manner, the user may optimize the temperature and/or power limit of the computing device. For example, the user may notice that the battery may have a rate of discharge for a given power situation that is greater than desired. The user may therefore change the battery charge discharge rate, such as the maximum computing component power limit for a given battery state of charge.

Furthermore, in some embodiments, the user may identify one or more malfunctioning components based on the virtual node data. For example, a malfunctioning processor may draw too much power to perform a given operation. The power limit of the processor may be flagged (e.g., highlighted) in the telemetry data shown to a user, which may indicate that the processor is malfunctioning. This may prompt the user to remove or replace the processor. In some examples, a malfunctioning processor may not draw as much power as anticipated. The user may notice that the maximum actual power limit from the processor is lower than expected (e.g., based on the power limit being highlighted in the telemetry data), which may indicate that the processor is malfunctioning. This may cause the user to remove or replace the processor, thereby improving performance of the computing device.

In some embodiments, the telemetry data may be communicated to a remote system. For example, a developer may wish to receive telemetry data to track trends across multiple devices. By receiving this telemetry data, the developer or other user may process and track trends such as poorly sized processors, batteries, and/or other computing components. To ensure user privacy, the data may be anonymized. Moreover, users may be able to opt-in or out of transmitting the telemetry data to the remote device.

In some embodiments, the telemetry data may be used by the developer to provide software and/or firmware updates to the computing system. For example, the developer may use the telemetry data to change how the operations process state data and/or information store in virtual nodes. In some examples, the developer may use the telemetry data to change the computing component power limits for selected criteria. In this manner, the developer may use trends across multiple computing devices to improve the performance of the computing devices.

In some embodiments, the telemetry data may allow the computing system and/or the user to identify computing components that may be replaced. For example, if the telemetry data indicates that a specific processor is consistently underperforming, then the developer and/or the operating system may flag this processor and recommend its replacement. In some embodiments, the user may provide input prior to changing controls in the operating system and/or replacing or upgrading a component. For example, the user may provide input regarding battery charge discharge rates, and the controls in the operating system and/or computing components may be replaced based at least in part on the user input.

Use Case 6: Identifying Misconfiguration of Thermal Management Elements

In some embodiments, one or more of the state data information inputs may produce erroneous results. For example, a power supply size state data may provide a power size value that is outside of an expected range. Because the power supply size will almost always fall within a range (e.g., from 0 W to 120 W), then a value outside of this range is likely erroneous. A subsequent operation performed on this state data may then make an erroneous determination (e.g., determine that the power supply unit is not present). Based on this determination, the computing component power limit may be selected despite the erroneous input.

In some embodiments, a method for providing information with virtual node data is performed by a thermal module, e.g., thermal algorithm(s) operating in conjunction with a processor and/or control circuitry of the device. Data about a computing device stored on a virtual node is received. at an operation of a control system. If the data is outside of an expected range, the virtual node output may be amended to include an error code.

For example, an output value stored in a virtual node may include a computing component power limit value that is in the magnitude of thousands of milliWatts (e.g., 15000 mW). If the input value is outside of the expected range, then the last digit or two digits of the output value may be amended to include an error code. For example, the output value of an erroneous input may be 15001 mW. Because 1 mW is less than the practical sensitivity of the power supply/output of the computing device, amending the computing component power limit by 0-10 mW may not affect the implementation of the computing component power limit.

When a user accesses this data stored in the virtual node, the user may be able to identify the error in the input state data based on the error code integrated into the data. In this manner, the user may be able to troubleshoot the error and change something to fix the problem. In some embodiments, the data stored in the virtual nodes may be monitored. Data values that have been amended with an error code may be highlighted. This information may be presented to the user (e.g., an individual user and/or a developer). Based on the error code, the user may then change a parameter of the computing system, such as an operation in a control system and/or a computing component.

A user interface according to the present disclosure includes several locations where a user may find edit thermal and power management system and operations, according to embodiments of the disclosure described herein. For example, the user may identify sensed and/or determined temperatures, such as the touch temperature and the battery temperature. The user may identify and, in some embodiments, modify the touch temperature limit. The user may further identify other operating characteristics, such as the fan RPM, the OS slider position, the device posture, the processor power consumption, the backlight power consumption, and the total system power consumption. This information may provide the user with the ability to track and manage the thermal operation and status of the computing device.

The user may further enter into interfaces that allow the user to identify and modify power management operations. For example, the user may check the battery level and the power source unit status (e.g., plugged in, not plugged in, and power source unit size). The user may identify and/or change the backlight level. The user may further enter into interfaces to manage the system brownout protection. The user may enter into interfaces to manage battery discharge rate protection. The user may further enter into interfaces to manage underpowered power source unit protection. In this manner, the user interfaces may allow the user to manage and monitor the thermal and power systems of the present disclosure.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: hardware computer-readable storage media and transmission computer-readable media.

In some embodiments, hardware computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

The present disclosure relates to systems and methods for communicating between components of a computing device to manage power and thermal performance of the computing device according to at least the examples provided in the sections below:

1. A method of thermal and power control in a computing device, the method comprising:
   at the computing device (e.g., computing device 100, FIG. 1):
   initializing a thermal module (e.g., module 120, FIG. 2) of the computing device, initializing the thermal module including:
   detecting a presence of a plurality of potential components (e.g., components 130, FIG. 2) of the computing device,
   querying each of the plurality of potential components to determine capabilities (e.g., reporting capabilities and operational capabilities) of each component,
   in response to the querying, for each of at least a subset of the components:
   receiving identification information (e.g., a GUID and instance identification) for the component, and
   based on the received identification information, configuring one or more interfaces of a plurality of predefined interfaces (e.g., OF modules 128, FIG. 2) of the thermal module to establish communication with the subset of components;
   receiving an input at the thermal module from a first component assigned to an interface of the thermal module (e.g., a temperature reading); and
   sending an output to a second component from the thermal module based on the input (e.g., adjusting operational speed of the second component).
2. The method of section 1, wherein initializing the thermal module occurs upon startup of the computing device.
3. The method of section 1 or 2 further comprising receiving an invalid response from at least one potential component and forgoing communicating with the component with the thermal module.
4. The method of any of sections 1-3, wherein initializing a thermal module comprises reading a system configuration from a unified extensible firmware interface (UEFI) (e.g., UEFI 224), a registry (e.g., registry 226), or a file, the system configuration including information regarding processing procedures for input interface data and mapping of input interface data to output interfaces.
5. The method of any of sections 1-4, wherein the detecting includes monitoring a plurality of potential components via an operating system (OS) of the computing device (e.g., monitoring reporting of the components to the OS).
6. The method of any of sections 1-5, further comprising sending a configuration file to a configurable component, the configuration file including reporting instructions to a configurable component to set reporting parameters from the component to the thermal module.
7. The method of section 6, wherein the configuration file sets the component to an event-based input mode, where the component reports inputs to the thermal module upon a value change of the component.
8. The method of section 6, wherein the configuration file sets the component to a trigger-based input mode, where the component sends an input to the thermal module when a reported value crosses a threshold value and the thermal module polls the component until the reported value is within the threshold value.
9. The method of section 8, wherein the thermal module polls the component at a first rate when the reported value is outside the threshold value and a second rate when the reported value is within the threshold value.
10. The method of any of sections 1-9, wherein querying the plurality of potential components includes requesting a device identification and capabilities of each potential component of the plurality of potential components.
11. The method of any of sections 1-10, wherein initializing the thermal module includes reading a blob configuration file that includes inputs and outputs.
12. The method of any of sections 1-11, further comprising displaying a graphical user interface (GUI) of the thermal module interfaces on a display (e.g., a graphical representation showing some or all of the information of FIG. 2).
13. The method of any of sections 1-12, wherein the at least one input includes temperature information (e.g., a temperature value).
14. The method of any of sections 1-13, wherein the at least one input includes power consumption information or processor usage information.
15. The method of any of sections 1-14, wherein the at least one input includes battery charge information (e.g., a current charge level).
16. The method of any of sections 1-15, wherein the at least one output includes a command to set a processor clock speed.
17. The method of any of sections 1-16, wherein the at least one output includes a command to change a display brightness value.
18. The method of any of sections 1-17, wherein the at least one output includes a target battery charging rate.
19. The method of any of sections 1-18, wherein receiving data from at least one input with the thermal module includes pulling the data from the at least one input (e.g., sending a query for information to the component and receiving the data in response to the query).
20. The method of any of sections 1-18, wherein receiving data from at least one input with the thermal module includes receiving data that is pushed from the at least one input (e.g., data that is sent without waiting for a query from the thermal module).
21. The method of any of sections 1-20, wherein the plurality of predefined interfaces includes a plurality of input interfaces (e.g., interfaces configured to receive information from components) and a plurality of output interfaces (e.g., interfaces configured to send information and/or instructions to components).
22. The method of any of sections 1-21 further comprising creating a directory of components in communication with the thermal module.
23. The method of any of sections 1-22, wherein the identification information includes at least one instance identification (ID) and global unique identification (GUID).
24. A non-transitory computer readable medium, that, when executed by a processor, causes the processor to perform any of the methods of sections 1-23.

25. A computing system (e.g., computing device 100, FIG. 1) comprising:
a processor (e.g., processor 106, FIG. 1);
a plurality of potential components (e.g., components 130, FIG. 2) in data communication with the processor; and
a hardware memory device (e.g., hardware storage device 112, FIG. 1), the hardware storage device having instructions stored thereon that, when executed by the processor, cause the processor to communicate with the plurality of potential components and perform any of the methods of sections 1-23.

26. A method for controlling temperature(s) or power limit(s) in a computing device (e.g., computing device 100), comprising:
obtaining results stored in a virtual node (e.g., virtual node 890, FIG. 10-1);
applying an operation (e.g., a multiplex operation at multiplexer 896, FIG. 10-1) to the results stored in the virtual node; and
providing instructions or information on an output channel (e.g., output channel 898, FIG. 10-1) based on result(s) of the operation.

27. The method of section 26, wherein the method is performed at a thermal module (e.g., thermal module 120, FIG. 2) or processor (e.g., processor 106, FIG. 1).

28. The method of section 26, further comprising receiving data from one or more components (e.g., battery data 886, FIG. 10-1) and applying a second operation (e.g., operation 2, FIG. 10-1) to the received data to generate the results stored in the virtual node.

29. The method of any of sections 26-28, wherein the operation includes one or more of: a minimum select function, a pass-through function, a multiplex function, or other mathematical functions.

30. The method of any of sections 26-29, wherein the output channel includes a thermal management output channel (e.g., a channel used to communication instructions to one or more active thermal management devices (e.g., thermal management device(s) 114, FIG. 1)).

31. The method of any of sections 26-30, further comprising changing a thermal management property based on the results of the operation in the output channel (e.g., adjusting a fan speed).

32. The method of section 31, wherein the thermal management property includes at least one of a processor speed, a power limit, and a fan speed.

33. A method of any of sections 26-32, further comprising:
receiving second results stored in one or more second virtual nodes;
applying a second operation to the second results; and
providing results of the second operation to an output channel.

34. The method of section 33, wherein the second operation is applied to the second results and to the results stored in the virtual node (e.g., the multiplex operation of multiplexer 896 in FIG. 1 is applied to the results of virtual nodes 890-1, 890-2, and 890-3).

35. The method of section 33 or 34, wherein the second operation includes at least one of a minimum select function, a maximum select function, an averaging function, and multiplex function.

36. A method for controlling temperature(s) or power limit(s) in a computing device (e.g., computing device 100, FIG. 1), comprising:
receiving state data (e.g., from one or more components 130, FIG. 2);
applying a first operation (e.g., operation 1, FIG. 10-4) to the state data;
storing results of the first operation to the state data in a virtual node (e.g., VN1, FIG. 10-4);
applying a second operation (e.g., at the multiplexer, FIG. 10-4) to the stored results; and
providing results of the second operation to an output channel (e.g., output channel in FIG. 10-4).

37. The method of section 36, wherein the state data comprises at least one of a measured temperature, a determined temperature, a virtual temperature, a power supply source, a power supply size, a state of charge of a power storage, a relative state of charge of a power storage, a posture of said computing device, a power storage discharge rate, a power storage charge rate, and a user-selected power limit.

38. The method of sections 36 or 37, wherein applying the first operation includes inputting the state data in a look-up table to determine the results of the first operation as an output of the look-up table.

39. The method of any of sections 36-38, wherein applying the first operation to the state data includes applying a mathematical operation to the state data.

40. The method of section 39, wherein applying the mathematical operation to the state data includes applying a linear mathematical formula to the state data.

41. The method of any of sections 36-40, wherein providing results of the second operation to an output channel includes one or more of: sending instructions to a component based on the results of the second operation, storing the results of the second operation, and presenting at least a subset of the results to a user.

42. The method of any of sections 36-41, wherein receiving the state data includes receiving a plurality of state data values from one or more components of the computing device.

43. The method of section 42, wherein applying the first operation includes applying the first operation to the plurality of state data values.

44. The method of section 42, wherein applying the first operation includes applying a plurality of first functions to the plurality of state data values.

45. The method of section 42, wherein storing the results of the first operation to the state data includes storing a plurality of results from the plurality of state data values in one or more virtual nodes.

46. The method of section 45, wherein applying the second operation to the plurality of results stored in the plurality of virtual nodes includes applying a multiplexer to the stored plurality of results.

47. The method of any of sections 36-45, wherein applying the second operation includes applying a multiplexer function 48. The method of any of sections 36-47, further comprising:
applying a third operation to the results of the first operation stored in the virtual node; and
storing results of the third operation in a second virtual node, and wherein applying the second operation to the stored results includes applying the second operation to the results of the third operation.

49. A method for controlling temperature(s) or power limit(s) in a computing device (e.g., corresponding to FIGS. 10-1-10-5), comprising:
   receiving power source unit size information (e.g., from a PSU component);
   receiving battery state of charge information (e.g., from a battery component);
   determining whether a power source unit is present based on the received power source unit size information;
   determining a first maximum processor peak power based on the battery state of charge information when the power source unit is determined not to be present;
   determining a second maximum processor peak power based on the battery state of charge information when the power source unit is determined to be present; and
   based on whether the power source unit is determined to be present and the received power source unit size information, selecting the first or second maximum processor peak power.
50. The method of section 49, wherein determining whether the power source unit is present includes determining whether the power source unit size information lies within a preset range of power source unit sizes (e.g., the range illustrated in Table 10.1 of FIG. 10-2).
51. The method of sections 49 or 50, wherein determining whether the power source unit is present includes inputting the power source unit size information into a look-up table (e.g., Table 10.1 of FIG. 10-2).
52. The method of any of sections 49-51, wherein determining the first maximum processor peak power based on the received battery state of charge information when the power source unit is not present includes applying a first mathematical function to the battery state of charge information, and wherein determining the second maximum processor peak power based on the received battery state of charge information when the power source unit is present includes applying a second mathematical function to the battery state of charge information.
53. The method of any of sections 49-52, wherein selecting the at least one of the first and second determined maximum processor peak powers includes using a multiplexer (e.g., multiplexer 896, FIG. 10-1).
54. The method of any of sections 49-53, wherein receiving the battery state of charge information includes receiving a relative battery state of charge based on a percentage of charge remaining.
55. A method for controlling temperature(s) or power limit(s) in a computing device (e.g., corresponding to FIG. 11), comprising:
   operating in a first state by executing a temperature or power control loop with a power limit threshold;
   while operating in the first state, receiving posture information for the device; and
   operating in a second state by adjusting the power limit threshold based on the posture information.
56. The method of section 55, wherein the posture information includes a notification of a change in posture of the computing device (e.g., a change in hinge angle of the device).
57. The method of sections 55 or 56, wherein the device is configured to operate in at least one of a laptop configuration, a closed configuration, and a studio configuration, and wherein the posture information indicates a current configuration of the device.
58. The method of any of sections 55-57, wherein adjusting the power limit threshold includes inputting the posture information into a look-up table to determine the adjusted power limit threshold (e.g., the posture information and temperature information are used to identify a power limit threshold in the look-up table).
59. A method for controlling temperature(s) or power limit(s) in a computing device (e.g., corresponding to FIG. 12-1), comprising:
   receiving power supply size information (e.g., from a power supply component);
   receiving battery state of charge information (e.g., from a battery component); and
   adjusting a power limit of at least one computing component (e.g., a CPU or GPU) based on the power supply size information and the battery state of charge information such that the power limit of the at least one computing component reaches an operating equilibrium with a battery state of charge (e.g., slowing a clock speed for the computing component such that it draws less power).
60. The method of section 59, wherein adjusting the power limit of the at least one computing component occurs in accordance with the battery state of charge information indicating that the battery state of charge is less than a predetermined charge threshold.
61. The method of sections 59 or 60, wherein adjusting the power limit of the at least one computing component includes adjusting the power limit with a non-zero rate of change of the power limit with respect to the battery state of charge.
62. The method of section 61, wherein adjusting the power limit with the non-zero rate of change includes reducing the power limit linearly with respect to the battery state of charge.
63. The method of any of sections 59-62, wherein the at least one computing component includes a processor (e.g., a CPU, GPU, or microprocessor).
64. The method of any of sections 59-63, wherein adjusting the power limit of the at least one computing component includes reducing the power limit in accordance with a power supply size being less than a threshold power supply size.
65. The method of any of sections 59-64, wherein adjusting the power limit of the at least one computing component includes reducing the power limit until a minimum power threshold is reached.
66. The method of any of sections 59-65, wherein the operating equilibrium is such that a battery is discharging to maintain a computing component power at a minimum power threshold.
67. The method of any of sections 59-66, wherein the operating equilibrium is such that a battery is not charging.
68. The method of any of sections 59-65, wherein the operating equilibrium is such that a battery is not charging or discharging.
69. The method of any of sections 59-69, wherein receiving the battery state of charge information includes receiving a first battery state of charge information for a first battery and receiving a second battery state of charge information for a second battery, and wherein the battery state of charge information includes an average battery state of charge based on the first battery state of charge information and the second battery state of charge information.

70. The method of section 69, wherein the average battery state of charge is a weighted average battery state of charge based on a first battery size of the first battery and a second battery size of the second battery.

71. A method for controlling temperature(s) or power limit(s) in a computing device (e.g., corresponding to FIG. 13-1), comprising:
   - receiving power supply size information (e.g., from a power supply component);
   - receiving battery charge discharge information (e.g., from a battery component);
   - determining whether a power supply unit is present based on the power supply size information; and
   - in accordance with a determination that the power supply unit is present, adjusting a power limit of at least one computing component such that a battery charge discharge rate based on the battery charge discharge information is maintained in a predetermined rate range.

72. The method of section 71, wherein adjusting the power limit of the at least one computing component includes initiating (or updating) a PID to maintain the battery charge discharge rate.

73. The method of section 71 or 72, wherein the predetermined rate range includes a target rate of zero Watts.

74. The method of any of sections 71-73, wherein the predetermined rate range is less than 10 Watts.

75. A method for controlling temperature or power limit in a computing device, comprising:
   - receiving battery state of charge information (e.g., from a first component 130);
   - determining whether a battery state of charge is above a predetermined state of charge based on the battery state of charge information;
   - if the battery state of charge is above the predetermined state of charge, adjusting a power limit of one or more computing components (e.g., one or more second components 130) such that a battery charge discharge rate is maintained within a first predetermined rate range; and
   - if the battery state of charge is below the predetermined state of charge, adjusting the power limit of the one or more computing components such that the battery charge discharge rate is maintained within a second predetermined rate range (e.g., in accordance with FIG. 13-3).

76. The method of section 75, further comprising:
   - receiving power supply unit information (e.g., from a third component 130); and
   - determining whether a power supply unit is present based on the power supply unit information (e.g., in accordance with Table 10.1 of FIG. 10-2).

77. The method of sections 75 or 76, wherein the first predetermined rate range includes a target rate of 1 C.

78. The method of any of sections 75-77, wherein the second predetermined rate range includes a target rate of 0.7 C.

79. The method of any of sections 75-78, wherein the predetermined state of charge is less than 20% capacity.

80. The method of any of sections 75-79, wherein the predetermined state of charge is less than 10% capacity.

81. The method of any of sections 75-80, wherein the predetermined state of charge is less than 5% capacity.

82. The method of any of sections 75-81, wherein the predetermined state of charge is less than 1% capacity.

83. The method of any of sections 75-82, wherein receiving the battery state of charge information includes receiving a first battery state of charge for a first battery and a second battery state of charge for a second battery.

84. The method of section 83, wherein determining whether the battery state of charge is above a predetermined threshold includes determining whether a first battery state of charge is above the predetermined threshold and whether a second battery state of charge is above the predetermined threshold.

85. The method of section 84, wherein:
   - if the first battery state of charge is above the predetermined state of charge, adjusting the power limit of the one or more computing components includes adjusting the power limit of the one or more computing components such that a first battery charge discharge rate of the first battery is maintained within the first predetermined rate range;
   - if the second battery state of charge is above the predetermined state of charge, adjusting the power limit of the one or more computing components includes adjusting the power limit of the one or more computing components such that a second battery charge discharge rate of the first battery is maintained within the first predetermined rate range;
   - if the first battery state of charge is below the predetermined state of charge, adjusting the power limit of the one or more computing components includes adjusting the power limit of the one or more computing components such that the first battery charge discharge rate is maintained within the second predetermined rate range; and
   - if the second battery state of charge is below the predetermined state of charge, adjusting the power limit of the one or more computing components includes adjusting the power limit of the one or more computing components such that the second battery charge discharge rate is maintained within the second predetermined rate range.

86. A method of tracking and adjusting performance of a computing device (e.g., corresponding to FIG. 14), comprising:
   - collecting telemetry data from one or more virtual nodes (e.g., virtual nodes 890, FIG. 10-1);
   - identifying a virtual node of the one or more virtual nodes with a value that is not within an expected range (e.g., virtual node 890-1); and
   - modifying at least one of controls for a computing component and power limit level of the computing component based on the value in the identified virtual node.

87. The method of section 86, further comprising displaying the telemetry data in a user interface.

88. The method of section 87, further comprising receiving user input prior to modifying at least one of the controls for the computing component and the power limit level of the computing component, wherein the user input requests, or gives consent, for the modification.

89. The method of any of sections 86-88, further comprising communicating the telemetry data to a remote device.

90. The method of section 89, wherein modifying at least one of the controls for the computing component and the power limit level of the computing component is in response to receiving controls from a user of the remote device.

91. The method of any of sections 86-90, further comprising providing instructions to a user of the computing device remove or replace an underperforming computing component.

92. A method for providing information with virtual node data, comprising:
  receiving data about a computing device from a virtual node;
  if the data received from the virtual node is outside of an expected range, amending the virtual node output to include state information (e.g., appending the state information to the data or modifying the least significant bits of the data); and
  flagging the data or adjusting display of the data to highlight that the data is outside of the expected range.

93. The method of section 92, further comprising instantiating a program on the computing device and wherein amending the virtual node output does not end the instantiated program.

94. The method of section 92 or 93, wherein the amended virtual node output does not affect processing of the amended virtual node output.

95. The method of any of sections 92-94, further comprising displaying the data to a user on a graphical user interface.

96. The method of section 95, wherein the graphical user interface includes a control to adjust the expected range.

97. A non-transitory computer readable medium, that, when executed by a processor, causes the processor to perform any one of the methods described herein (e.g., any one of the methods of sections 26-93).

98. A computing system (e.g., computing device 100, FIG. 1) comprising:
  a processor (e.g., processor 106, FIG. 1); and
  a hardware memory device (e.g., hardware storage device 112, FIG. 1), the hardware storage device having instructions stored thereon that, when executed by the processor, cause the processor to perform any one of the methods described herein (e.g., any one of the methods of sections 26-93).

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for controlling a power limit in a computing device, comprising:
  initializing a thermal module of the computing devices;
  with the thermal module, establishing communication with a battery and a processor of the computing device at a plurality of interfaces of the thermal module, wherein the thermal module is agnostic to the origin of the battery and of the processor, and wherein one or more of the thermal module, the battery, or the processor originates from a different producer;
  receiving, with the thermal module, battery state of charge information from the battery;
  determining whether a power source unit is present based on receiving, with the thermal module, power source unit size information;
    when the power source unit is determined to not be present, determining a maximum processor peak power based on the battery state of charge information; and
    when the power source unit is determined to be present, determining the maximum processor peak power based on the battery state of charge information and based on the power source unit size information; and
  communicating the determined maximum processor peak power to the processor with the thermal module.

2. The method of claim 1, wherein determining that the power source unit is present includes determining that the power source unit size information lies within a range of power source unit size values.

3. The method of claim 2, wherein the range of power source unit size values is between 1 and 15,000 mW.

4. The method of claim 1, wherein determining whether the power source unit is present includes inputting the power source unit size information into a look-up table.

5. The method of claim 1, wherein, when the power source unit is determined to be present, the maximum processor peak power is determined to be greater than a power capacity of the power source unit.

6. The method of claim 1, wherein determining the maximum processor peak power when the power source unit is determined to be present includes determining the maximum processor peak power to prevent a brownout condition of the computing device associated with the maximum processor peak power exceeding a power capacity of the power source unit.

7. The method of claim 1, wherein determining the maximum processor peak power includes determining the maximum processor peak power using a multiplexer to select the determined maximum processor peak power.

8. The method of claim 1, wherein receiving the battery state of charge information includes receiving a relative battery state of charge based on a percentage of charge remaining.

9. The method of claim 1, wherein a relationship between the maximum processor peak power and the battery state of charge is linear.

10. The method of claim 1, wherein the battery state of charge information includes an average state of charge of multiple batteries of the computing device.

11. The method of claim 1, wherein the determined maximum processor peak power is modifiable by a user.

12. The method of claim 1, wherein determining the maximum processor peak power based on the battery state of charge information includes determining whether the battery state of charge is over a state of charge threshold.

13. A system, comprising:
- a battery;
- a thermal module;
- a processor;
- memory in electronic communication with the processor; and
- instructions stored in the memory, the instructions being executable by the processor to:
  - initialize the thermal module;
  - with the thermal module, establish communication with the battery and the processor at a plurality of interfaces of the thermal module, wherein the thermal module is agnostic to the origin of the battery and of the processor, and wherein one or more of the thermal module, the battery, or the processor originates from a different producer;
  - receive, with the thermal module, battery state of charge information from the battery;
  - determine whether a power source unit is present based on receiving, with the thermal module, power source unit size information;
    - when the power source unit is determined to not be present, determine a maximum processor peak power based on the battery state of charge information; and
    - when the power source unit is determined to be present, determine the maximum processor peak power based on the battery state of charge information and based on the power source unit size information; and
  - communicating the determined maximum processor peak power to the processor with the thermal module.

14. The system of claim 13, wherein determining that the power source unit is present includes determining that the power source unit size information lies within a range of power source unit size values.

15. The system of claim 13, wherein determining whether the power source unit is present includes inputting the power source unit size information into a look-up table.

16. The system of claim 13, wherein, when the power source unit is determined to be present, the maximum processor peak power is determined to be greater than a power capacity of the power source unit.

17. The system of claim 13, wherein determining the maximum processor peak power when the power source unit is determined to be present includes determining the maximum processor peak power to prevent a brownout condition of the system associated with the maximum processor peak power exceeding a power capacity of the power source unit.

18. The system of claim 13, wherein determining the maximum processor peak power includes determining the determined maximum processor peak power using a multiplexer to select the determined maximum processor peak power.

19. The system of claim 13, wherein receiving the battery state of charge information includes receiving a relative battery state of charge based on a percentage of charge remaining.

20. A computer-readable storage medium including instructions that, when executable by a processor, cause the processor to:
- initialize a thermal module;
- with the thermal module, establish communication with a battery and the processor at a plurality of interfaces of the thermal module, wherein the thermal module is agnostic to the origin of the battery and of the processor, and wherein one or more of the thermal module, the battery, or the processor originates from a different producer;
- receive, with the thermal module, battery state of charge information from the battery;
- determine whether a power source unit is present based on receiving, with the thermal module, power source unit size information;
  - when the power source unit is determined to not be present, determine a maximum processor peak power based on the battery state of charge information; and
  - when the power source unit is determined to be present, determine the maximum processor peak power based on the battery state of charge information and based on the power source unit size information; and
- communicating the determined maximum processor peak power to the processor with the thermal module.

* * * * *